United States Patent
Han et al.

(10) Patent No.: US 11,339,230 B2
(45) Date of Patent: May 24, 2022

(54) TRANSITION METAL COMPOUND, CATALYST COMPOSITION INCLUDING THE SAME, AND METHOD FOR PREPARING ETHYLENE HOMOPOLYMER OR COPOLYMER OF ETHYLENE AND α-OLEFIN USING THE SAME

(71) Applicant: SABIC SK NEXLENE COMPANY PTE. LTD., Singapore (SG)

(72) Inventors: Yonggyu Han, Daejeon (KR); Miji Kim, Daejeon (KR); Choonsik Shim, Daejeon (KR); Hyunmin Jang, Daejeon (KR); Sangbae Cheong, Daejeon (KR); Hyeong Taek Ham, Naju-Si (KR)

(73) Assignee: SABIC SK NEXLENE COMPANY PTE. LTD., Singapore (SG)

( * ) Notice: Subject to any disclaimer, the term of this patent is extended or adjusted under 35 U.S.C. 154(b) by 41 days.

(21) Appl. No.: 16/641,190

(22) PCT Filed: Jun. 19, 2018

(86) PCT No.: PCT/IB2018/054486
§ 371 (c)(1),
(2) Date: Feb. 21, 2020

(87) PCT Pub. No.: WO2019/038605
PCT Pub. Date: Feb. 28, 2019

(65) Prior Publication Data
US 2021/0139617 A1    May 13, 2021

(30) Foreign Application Priority Data
Aug. 21, 2017 (KR) .................. 10-2017-0105468

(51) Int. Cl.
| | | |
|---|---|---|
| *C07F 17/00* | (2006.01) | |
| *C08F 4/6592* | (2006.01) | |
| *C08F 110/02* | (2006.01) | |
| *C08F 210/16* | (2006.01) | |
| *C08F 10/02* | (2006.01) | |
| *C08F 4/659* | (2006.01) | |

(52) U.S. Cl.
CPC .............. *C08F 10/02* (2013.01); *C07F 17/00* (2013.01); *C08F 4/6592* (2013.01); *C08F 4/65912* (2013.01); *C08F 110/02* (2013.01); *C08F 210/16* (2013.01); *C08F 2420/01* (2013.01)

(58) Field of Classification Search
CPC ....... C07F 17/00; C08F 4/6592; C08F 210/16
See application file for complete search history.

(56) References Cited

U.S. PATENT DOCUMENTS

| | | |
|---|---|---|
| 4,752,597 A | 6/1988 | Turner |
| 5,198,401 A | 3/1993 | Turner et al. |
| 6,329,478 B1 | 12/2001 | Katayama et al. |
| 2005/0154158 A1 | 7/2005 | Hanaoka et al. |
| 2008/0161514 A1* | 7/2008 | Senda ..................... C08F 10/02 526/126 |
| 2008/0306293 A1 | 12/2008 | Senda et al. |
| 2014/0316085 A1 | 10/2014 | Stewart et al. |

FOREIGN PATENT DOCUMENTS

| | | |
|---|---|---|
| EP | 0320762 A2 | 6/1989 |
| EP | 0372632 A1 | 6/1990 |
| EP | 0420436 B1 | 8/1996 |
| EP | 0416815 A1 | 8/1997 |
| EP | 0842939 B1 | 10/2004 |
| JP | S6392621 A | 4/1988 |
| JP | H0284405 A | 3/1990 |
| JP | H032347 A | 1/1991 |
| JP | 2006347899 A | 12/2006 |

OTHER PUBLICATIONS

Randall, J., "A Review of High Resolution Liquid 13Carbon Nuclear Magnetic Resonance Characterizations of Ethylene-Based Polymers," Journal of Macromolecular Science Part C Polymer Reviews, vol. 29, No. 2-3, May 1989, pp. 201-317.
Hanaoka, H. et al., "Synthesis and characterization of titanium and zirconium complexes with silicone-bridged phenoxycyclopentadienyl ligands," vol. 692, No. 19, Sep. 1, 2007, pp. 4059-4066.
SA Korean Intellectual Property Office, International Search Report Issued in Application No. PCT/IB2018/054486, Oct. 24, 2018, WIPO, 4 pages.
Randall, J. et al., "A Review of High Resolution Liquid 13Carbon Nuclear Magnetic Resonance Characterizations of Ethylene-Based Polymers," Journal of Macromolecular Science, Part C, vol. 29, No. 2-3, May 1989, 119 pages.
Hanaoka, H. et al., "Synthesis and characterization of titanium and ziconium complexes with silicone-bridged phenoxycyclopentadienyl ligands," Journal of Organometallic Chemistry, vol. 692, No. 19, Sep. 1, 2007, 8 pages.

* cited by examiner

*Primary Examiner* — Caixia Lu
(74) *Attorney, Agent, or Firm* — McCoy Russell LLP

(57) ABSTRACT

Provided are a novel transition metal compound based on a cyclopenta[a]naphthalene group, a transition metal catalyst composition having high catalytic activity for preparing an ethylene homopolymer or a copolymer of ethylene and at least one α-olefin including the same, a method for preparing an ethylene homopolymer or a copolymer of ethylene and α-olefin using the same, and the ethylene homopolymer or the copolymer of ethylene and α-olefin prepared above. The metallocene compound according to the present invention and the catalyst composition including the same may provide a high thermal stability of the catalyst to maintain high catalytic activity even at a high temperature, have good copolymerization reactivity with other olefins, and prepare a high molecular weight polymer at a high yield.

17 Claims, 1 Drawing Sheet

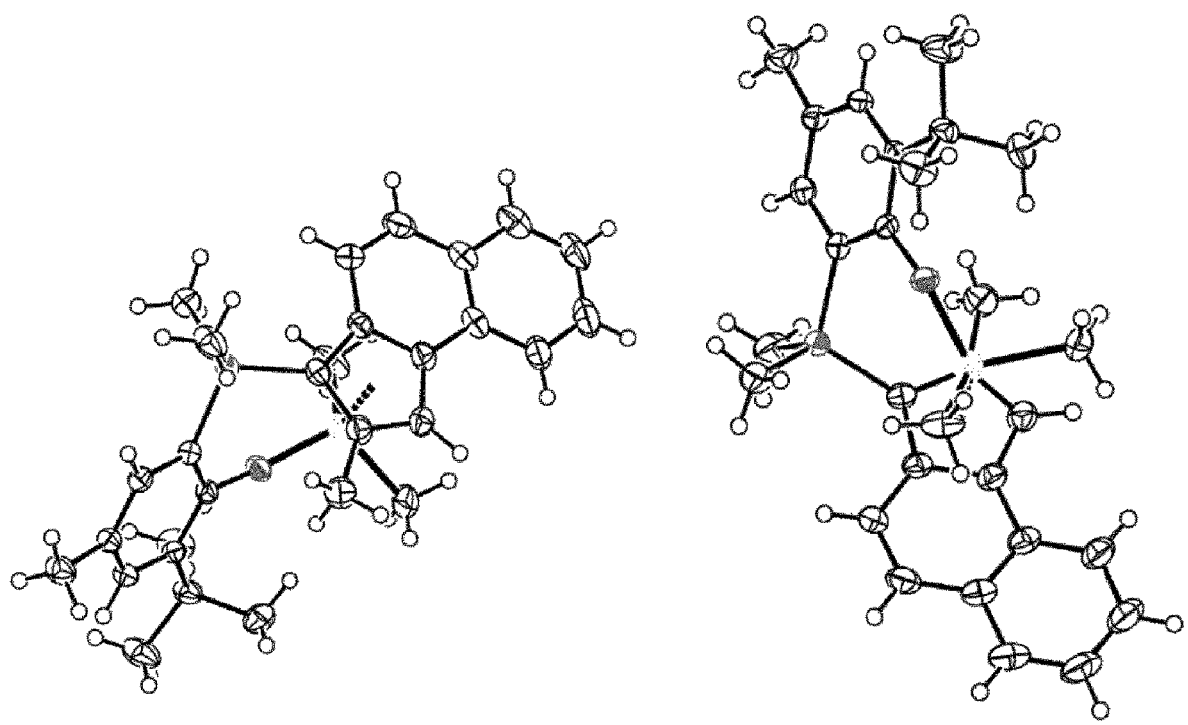

TRANSITION METAL COMPOUND, CATALYST COMPOSITION INCLUDING THE SAME, AND METHOD FOR PREPARING ETHYLENE HOMOPOLYMER OR COPOLYMER OF ETHYLENE AND α-OLEFIN USING THE SAME

CROSS-REFERENCE TO RELATED APPLICATIONS

The present application is a U.S. National Phase of International Patent Application Serial No. PCT/IB2018/054486 entitled "NOVEL TRANSITION METAL COMPOUND, CATALYST COMPOSITION INCLUDING THE SAME, AND METHOD FOR PREPARING ETHYLENE HOMOPOLYMER OR COPOLYMER OF ETHYLENE AND α-OLEFIN USING THE SAME," filed on Jun. 19, 2018. International Patent Application Serial No. PCT/IB2018/054486 claims priority to Korean Patent Application No. 10-2017-0105468 filed on Aug. 21, 2017. The entire contents of each of the above-referenced applications are hereby incorporated by reference for all purposes.

TECHNICAL FIELD

The present invention relates to a novel transition metal compound, a transition metal catalyst composition having high catalytic activity for preparing an ethylene homopolymer or a copolymer of ethylene and at least one α-olefin including the same, a method for preparing an ethylene homopolymer or a copolymer of ethylene and α-olefin using the same, and the ethylene homopolymer or the copolymer of ethylene and α-olefin prepared above.

BACKGROUND

Conventionally, the so-called Ziegler-Natta catalyst system composed of a main catalyst component of a titanium or vanadium compound and a cocatalyst component of an alkyl aluminum compound has been generally used for preparing an ethylene homopolymer or a copolymer of ethylene and α-olefins. The Ziegler-Natta catalyst system exhibits high activity for ethylene polymerizations. However, there are disadvantages in that the resulting polymer generally has broad molecular weight distributions due to non-uniform catalytic active sites, and in particular, composition distributions of the copolymers of ethylene and α-olefins is not uniform.

Since a metallocene catalyst system composed of a metallocene compound of transition metals of Group 4 in the periodic table, such as titanium, zirconium, hafnium, etc., and methylaluminoxanes, which are cocatalysts, are a homogeneous catalyst having a single species catalytic active site, it is characterized in that the metallocene catalyst system is capable of preparing polyethylenes having narrow molecular weight distributions and uniform composition distributions as compared to the existing Ziegler-Natta catalyst systems. For example, European Patent Laid-Open Publication No. 320,762, No. 372,632 or Japanese Patent Laid-Open Publication No. S63-092621, No. H02-84405 or No. H03-2347 reported that it was possible to prepare polyethylenes in which a molecular weight distribution (Mw/Mn) has a range of 1.5 to 2.0 by activating the metallocene compounds such as $Cp_2TiCl_2$, $Cp_2ZrCl_2$, $Cp_2ZrMeCl$, $Cp_2ZrMe_2$, ethylene$(IndH_4)_2ZrCl_2$, etc., with the cocatalysts, methylaluminoxanes to thereby polymerize ethylene with high activity. However, it is difficult to obtain a high molecular weight polymer in the catalyst system. In particular, it is known that when applied to a solution polymerization method that is performed at a high temperature of 120° C. or higher, a polymerization activity is rapidly reduced and a β-dehydrogenation reaction predominates, and thus it is not suitable for preparing a high molecular weight polymer in which a weight average molecular weight (Mw) is 100,000 or more.

Meanwhile, as a catalyst capable of preparing a polymer having a high catalytic activity and a high molecular weight by ethylene homopolymerizations or copolymerizations of ethylene and α-olefins under solution polymerization conditions, a so-called geometrically constrained non-metallocene-based catalyst (so-called a single active site catalyst) in which a transition metal is linked in a ring form, has been reported. European Patent Nos. 0416815 and 0420436 suggested an example in which an amide group is linked to one cyclopentadiene ligand in the ring form. European Patent No. 0842939 showed an example of a catalyst in which a phenol-based ligand as an electron donor compound is linked in the ring form with a cyclopentadiene ligand. In the geometrically constrained catalyst, reactivity with high alpha-olefin is remarkably improved due to a lowered steric hindrance effect of the catalyst itself, but there are many difficulties in commercial use. Therefore, it is important to secure a more competitive catalyst system that has properties required as a commercialization catalyst based on economic feasibility, including excellent high temperature activity, excellent reactivity with the high alpha-olefins, and ability to prepare a high molecular weight polymer, etc.

SUMMARY OF THE INVENTION

Technical Problem

In order to overcome problems of the related art, the present inventors conducted extensive research, and found that a transition metal compound having a structure in which a transition metal of Group 4 in the periodic table as a central metal is linked via a ligand in which a plurality of benzene rings are fused to a cyclopentadiene ring as a ligand having a rigid plane structure and including abundant and widely delocalized electrons; and a phenoxy group being substituted with alkyl in which a substituent useful for improving solubility and performance is capable of being easily introduced, exhibited excellent catalytic activity in polymerization of ethylene and olefins. Based on this finding, the present inventors developed a catalyst capable of preparing a high molecular weight ethylene homopolymer or copolymer of ethylene and α-olefin having a desired density with high activity by changing a polymerization temperature in a solution polymerization process that is performed at a high temperature, and completed the present invention.

An object of the present invention is to provide a transition metal compound useful as a catalyst for preparing an ethylene homopolymer or a copolymer of ethylene and α-olefin, and also a catalyst composition including the same.

Another object of the present invention is to provide a method for economically preparing an ethylene homopolymer or a copolymer of ethylene and α-olefin using the catalyst composition including the transition metal compound in view of a commercial aspect.

Still another object of the present invention is to provide a single active site catalyst having a simple synthesis route to be very economically synthesized, and having high activity in olefin polymerization, and a polymerization method for economically preparing an ethylene homopolymer or a copolymer of ethylene and α-olefin having various properties using the catalyst component in view of a commercial aspect.

Technical Solution

In one general aspect, there is provided a novel transition metal compound based on the cyclopenta[a]naphthalene group represented by Chemical Formula 1, below. More specifically, the transition metal compound may have a structure in which a transition metal of Group 4 in the periodic table as a central metal is linked via a cyclopenta[a]naphthalene group having a rigid plane structure and including abundant and widely delocalized electrons; and a phenoxy group being substituted with alkyl in which a substituent useful for improving solubility and performance is capable of being easily introduced, wherein the cyclopenta[a]naphthalene group and the phenoxy group substituted with alkyl are linked via silyl:

[Chemical Formula 1]

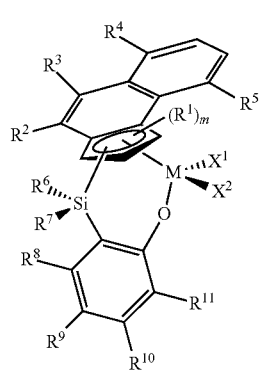

in Chemical Formula 1:
M is a transition metal of Group 4 having an oxidation number of +2, +3 and +4 in the periodic table;
$R^1$ to $R^5$ are each independently hydrogen, (C1-C20)alkyl, (C6-C20)aryl, (C3-C20)cycloalkyl, halogen, (C2-C20)alkenyl, (C3-C20)heteroaryl, (C3-C20)heterocycloalkyl, —$OR^{a1}$, —$SR^{a2}$, —$NR^{a3}R^{a4}$ or —$PR^{a5}R^{a6}$, or the $R^2$ to $R^4$ may be linked to an adjacent substituent via (C2-C7)alkylene or (C3-C7)alkenylene with or without an aromatic ring to form a fused ring;
m is an integer of 1 or 2, and when m is an integer of 2, $R^1$ may be the same as each other or different from each other;
$R^6$ and $R^7$ are each independently hydrogen, (C1-C20)alkyl, halo(C1-C20)alkyl, (C3-C20)cycloalkyl, (C6-C20)aryl, (C1-C20)alkyl(C6-C20)aryl, (C6-C20)aryl(C1-C20)alkyl, (C3-C20)heteroaryl, —$OR^{a1}$, —$SR^{a2}$, —$NR^{a3}R^{a4}$ or —$PR^{a5}R^{a6}$, or the $R^6$ and $R^7$ may be linked via (C4-C7)alkylene to form a ring;
$R^8$ to $R^{10}$ are each independently hydrogen, (C1-C20)alkyl, halo(C1-C20)alkyl, halogen, (C6-C20)aryl, (C3-C20)cycloalkyl, halogen, (C2-C20)alkenyl, (C3-C20)heteroaryl, (C1-C20)heterocycloalkyl, —$OR^{a1}$, —$SR^{a2}$, —$NR^{a3}R^{a4}$ or —$PR^{a5}R^{a6}$, or the $R^8$ to $R^{10}$ may be linked to an adjacent substituent via (C4-C7)alkylene with or without an aromatic ring to form a fused ring;
$R^{11}$ is (C1-C20)alkyl or may be linked to $R^{10}$ via (C4-C7)alkenylene with or without an aromatic ring to form a fused ring, and the alkyl of $R^{11}$ may be further substituted with at least one selected from the group consisting of halogen, (C1-C20)alkyl, halo(C1-C20)alkyl, (C6-C20)aryl, (C1-C20)alkyl(C6-C20)aryl, (C6-C1)aryl(C1-C20)alkyl, —$OR^{a1}$, —$SR^{a2}$, —$NR^{a3}R^{a4}$, and —$PR^{a5}R^{a6}$;
$R^{a1}$ to $R^{a6}$ are each independently (C1-C20)alkyl or (C6-C20)aryl;
the alkyl, aryl, cycloalkyl, heteroaryl or heterocycloalkyl of $R^1$ to $R^5$ and $R^8$ to $R^{10}$ and the alkyl or aryl of $R^{a1}$ to $R^{a6}$ may be further substituted with at least one selected from the group consisting of halogen, (C1-C20)alkyl, halo(C1-C20)alkyl, (C1-C20)alkoxy, (C6-C20)aryl, (C6-C20)aryloxy, nitro, cyano, —$SiR^{b1}R^{b2}R^{b3}$, —$SR^{b4}$, —$NR^{b5}R^{b6}$ and —$PR^{b7}R^{b8}$;
$R^{b1}$ to $R^{b8}$ are each independently (C1-C20)alkyl, (C6-C20)aryl, (C6-C20)ar(C1-C20)alkyl, (C1-C20)alkyl(C6-C20)aryl or (C3-C20)cycloalkyl;
$X^1$ and $X^2$ are each independently halogen, (C1-C20)alkyl, (C3-C20)cycloalkyl, (C6-C20)aryl, (C6-C20)aryl(C1-C20)alkyl, ((C1-C20)alkyl(C6-C20)aryl)(C1-C20)alkyl, (C1-C20)alkoxy, (C6-C20)aryloxy, (C1-C20)alkyl(C6-C20)aryloxy, (C1-C20)alkoxy(C6-C20)aryloxy, $OSiR^aR^bR^c$, —$SR^d$, —$NR^eR^f$, —$PR^gR^h$ or (C1-C20)alkylidene;
$R^a$ to $R^d$ are each independently (C1-C20)alkyl, (C6-C20)aryl, (C6-C20)ar(C1-C20)alkyl, (C1-C20)alkyl(C6-C20)aryl or (C3-C20)cycloalkyl;
$R^e$ to $R^h$ are each independently (C1-C20)alkyl, (C6-C20)aryl, (C6-C20)ar(C1-C20)alkyl, (C1-C20)alkyl(C6-C20)aryl, (C3-C20)cycloalkyl, tri(C1-C20)alkylsilyl or tri(C6-C20)arylsilyl;
with the proviso that when one of $X^1$ and $X^2$ is (C1-C20)alkylidene, the other one is ignored; and
the heteroaryl and heterocycloalkyl include at least one heteroatom selected from N, O and S.

In another general aspect, there is provided a transition metal catalyst composition for preparing an ethylene homopolymer or a copolymer of ethylene and α-olefin that includes the transition metal compound represented by Chemical Formula 1; and a cocatalyst selected from an aluminum compound, a boron compound, or a mixture thereof.

In still another general aspect, there is provided a method for preparing an ethylene homopolymer or a copolymer of ethylene and α-olefin using the catalyst composition.

In still another general aspect, there is provided an ethylene homopolymer or a copolymer of ethylene and α-olefin prepared by using the transition metal compound represented by Chemical Formula 1 or the catalyst composition.

Advantageous Effects

The transition metal compound or the catalyst composition comprising the transition metal compound according to the present invention may have a simple synthesis process to be capable of being easily prepared with high yield by an economical method, and further, may provide a high thermal stability of the catalyst to be capable of maintaining high catalytic activity at a high temperature, having good copolymerization reactivity with other olefins, and preparing the high molecular weight polymer having a desired density with high yield by adjusting a polymerization temperature, and thus the commercial utility is higher than those of previously known metallocene and non-metallocene single active site catalysts. Therefore, the transition metal according to the present invention and the catalyst composition including the same may be effectively used for the preparation of the ethylene homopolymer or the copolymer of ethylene and α-olefin having various physical properties.

BRIEF DESCRIPTION OF THE DRAWINGS

FIG. 1 shows the X-ray crystallography crystal structure of the transition metal compound 1 prepared in Example 1.

DETAILED DESCRIPTION

Hereinafter, the present invention will be described in detail. Here, unless technical and scientific terms used herein are defined otherwise, they have meanings understood by those skilled in the art to which the present invention pertains. Known functions and components which obscure the description and the accompanying drawings of the present invention with unnecessary detail will be omitted.

The transition metal compound according to an exemplary embodiment of the present invention is a transition metal compound based on a cyclopenta[a]naphthalene group represented by Chemical Formula 1 below, and may have a structure in which a transition metal of Group 4 in the periodic table as a central metal is linked via a cyclopenta[a]naphthalene group having a rigid plane structure and including abundant and widely delocalized electrons; and a phenoxy group being substituted with alkyl in which a substituent useful for improving solubility and performance is capable of being easily introduced, wherein the cyclopenta[a]naphthalene group and the phenoxy group substituted with alkyl are linked via silyl, thereby exhibiting excellent catalytic activity in polymerization of ethylene and olefins to provide a structural advantage which is advantageous for obtaining a high efficiency and high molecular weight ethylene polymer:

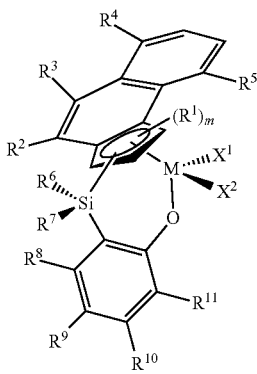

[Chemical Formula 1]

in Chemical Formula 1:
M is a transition metal of Group 4 in the periodic table;
$R^1$ to $R^5$ are each independently hydrogen, (C1-C20)alkyl, (C6-C20)aryl, (C3-C20)cycloalkyl, halogen, (C2-C20)alkenyl, (C3-C20)heteroaryl, (C3-C20)heterocycloalkyl, $-OR^{a1}$, $-SR^{a2}$, $-NR^{a3}R^{a4}$ or $-PR^{a5}R^{a6}$, or the $R^2$ to $R^4$ may be linked to an adjacent substituent via (C2-C7)alkylene or (C3-C7)alkenylene with or without an aromatic ring to form a fused ring;
m is an integer of 1 or 2, and when m is an integer of 2, $R^1$ may be the same as each other or different from each other;

$R^6$ and $R^7$ are each independently hydrogen, (C1-C20)alkyl, halo(C1-C20)alkyl, (C3-C20)cycloalkyl, (C6-C20)aryl, (C1-C20)alkyl(C6-C20)aryl, (C6-C20)aryl(C1-C20)alkyl, (C3-C20)heteroaryl, $-OR^{a1}$, $-SR^{a2}$, $-NR^{a3}R^{a4}$ or $-PR^{a5}R^{a6}$, or the $R^6$ and $R^7$ may be linked via (C4-C7)alkylene to form a ring;
$R^8$ to $R^{10}$ are each independently hydrogen, (C1-C20)alkyl, halo(C1-C20)alkyl, halogen, (C6-C20)aryl, (C3-C20)cycloalkyl, halogen, (C2-C20)alkenyl, (C3-C20)heteroaryl, (C1-C20)heterocycloalkyl, $-OR^{a1}$, $-SR^{a2}$, $-NR^{a3}R^{a4}$ or $-PR^{a5}R^{a6}$, or the $R^8$ to $R^{10}$ may be linked to an adjacent substituent via (C4-C7)alkenylene with or without an aromatic ring to form a fused ring;
$R^{11}$ is (C1-C20)alkyl or may be linked to the $R^{10}$ via (C4-C7)alkenylene with or without an aromatic ring to form a fused ring, and the alkyl of $R^{11}$ may be further substituted with at least one selected from the group consisting of halogen, (C1-C20)alkyl, halo(C1-C20)alkyl, (C6-C12)aryl, (C1-C10)alkyl(C6-C12)aryl, (C6-C12)aryl(C1-C10)alkyl, $-OR^{a1}$, $-SR^{a2}$, $-NR^{a3}R^{a4}$, and $-PR^{a5}R^{a6}$;
$R^{a1}$ to $R^{a6}$ are each independently (C1-C20)alkyl or (C6-C20)aryl;
the alkyl, aryl, cycloalkyl, heteroaryl or heterocycloalkyl of $R^1$ to $R^5$ and $R^8$ to $R^{10}$ and the alkyl or aryl of $R^{a1}$ to $R^{a6}$ may be further substituted with at least one selected from the group consisting of halogen, (C1-C20)alkyl, halo(C1-C20)alkyl, (C1-C20)alkoxy, (C6-C20)aryl, (C6-C20)aryloxy, nitro, cyano, $-OSiR^{b1}R^{b2}R^{b3}$, $-SR^{b4}$, $-NR^{b5}R^{b6}$ and $-PR^{b7}R^{b8}$;
$R^{b1}$ to $R^{b8}$ are each independently (C1-C20)alkyl, (C6-C20)aryl, (C6-C20)ar(C1-C20)alkyl, (C1-C20)alkyl(C6-C20)aryl or (C3-C20)cycloalkyl;
$X^1$ and $X^2$ are each independently halogen, (C1-C20)alkyl, (C3-C20)cycloalkyl, (C6-C20)aryl, (C6-C20)aryl(C1-C20)alkyl, ((C1-C20)alkyl(C6-C20)aryl)(C1-C20)alkyl, (C1-C20)alkoxy, (C6-C20)aryloxy, (C1-C20)alkyl(C6-C20)aryloxy, (C1-C20)alkoxy(C6-C20)aryloxy, $-OSiR^aR^bR^c$, $-SR^d$, $-NR^eR^f$, $-PR^gR^h$ or (C1-C20)alkylidene;
$R^a$ to $R^d$ are each independently (C1-C20)alkyl, (C6-C20)aryl, (C6-C20)ar(C1-C20)alkyl, (C1-C20)alkyl(C6-C20)aryl or (C3-C20)cycloalkyl;
$R^e$ to $R^h$ are each independently (C1-C20)alkyl, (C6-C20)aryl, (C6-C20)ar(C1-C20)alkyl, (C1-C20)alkyl(C6-C20)aryl, (C3-C20)cycloalkyl, tri(C1-C20)alkylsilyl or tri(C6-C20)arylsilyl;
with the proviso that when one of $X^1$ and $X^2$ is (C1-C20)alkylidene, the other one is ignored; and
the heteroaryl and heterocycloalkyl include at least one heteroatom selected from N, O and S.

The term "alkyl" as used herein, means a monovalent linear or branched saturated hydrocarbon radical only composed of carbon atoms and hydrogen atoms. Examples of the alkyl radical include methyl, ethyl, propyl, isopropyl, butyl, isobutyl, t-butyl, pentyl, hexyl, octyl, nonyl, etc., but the present invention is not limited thereto.

The term "aryl" as used herein, means an organic radical derived from aromatic hydrocarbon due to removal of one hydrogen, and includes a single ring system or a fused ring system properly including 4 to 7 ring atoms, preferably, 5 or 6 ring atoms in each ring, and even includes a form in which a plurality of aryls are connected by a direct bond. The fused ring system may include an aliphatic ring such as a saturated or partially saturated ring, and necessarily includes at least one aromatic ring. In addition, the aliphatic ring may include nitrogen, oxygen, sulfur, carbonyl, etc., in a ring. Specific examples of the aryl radical include phenyl, naphthyl, biphenyl, indenyl, fluorenyl, phenanthrenyl, anthracenyl, triphenylenyl, pyrenyl, chrycenyl, naphthacenyl, 9,10-dihydroanthracenyl, etc.

The term "heteroaryl" as used herein, means an aryl group including 1 to 4 heteroatoms selected from N, O, and S as an aromatic ring framework atom and carbon as the remaining aromatic ring framework atom, is a 5- to 6-membered monocyclic heteroaryl and a polycyclic heteroaryl condensed with at least one benzene ring, and may be partially saturated. In addition, the heteroaryl in the present invention includes even a form in which one or more heteroaryls are connected by a single bond. Examples of the heteroaryl group include pyrrole, quinoline, isoquinoline, pyridine, pyrimidine, oxazole, thiazole, thiadiazole, triazole, imidazole, benzoimidazole, isoxazole, benzoisoxazole, thiophene, benzothiophene, furan, benzofuran, etc., but the present invention is not limited thereto.

The term "cycloalkyl" as used herein, refers to a monovalent saturated carbocyclic radical composed of one or more rings. Examples of the cycloalkyl radical include cyclopropyl, cyclobutyl, cyclopentyl, cyclohexyl, cycloheptyl, etc., but the present invention is not limited thereto.

The terms "halo" or "halogen" as used herein, refers to a fluorine atom, a chlorine atom, a bromine atom or an iodine atom.

The term "haloalkyl" as used herein, refers to an alkyl substituted with one or more halogens, and may include trifluoromethyl, etc., as examples.

The terms "alkoxy" and "aryloxy as used herein, refer to an —O-alkyl radical and an —O-aryl radical, respectively, wherein the alkyl and aryl are the same as defined above.

The transition metal compound represented by Chemical Formula 1 according to the present invention may have a structure in which a ligand compound having a specific structure is combined with the transition metal to thereby have a high catalytic activity and easily control electronic/stereoscopic environment around the transition metal, and thus it is possible to easily control properties such as a chemical structure, molecular weight, molecular weight distribution, density, and mechanical properties, etc., of an ethylene homopolymer or a copolymer of ethylene and α-olefin to be synthesized.

In an exemplary embodiment of the present invention, the transition metal compound represented by Chemical Formula 1 may be a transition metal compound represented by Chemical Formulas 2, 3, or 4 below:

[Chemical Formula 2]

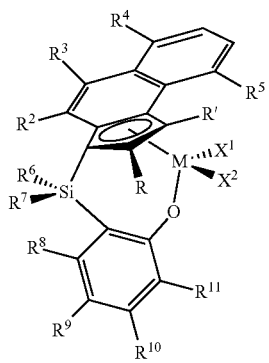

[Chemical Formula 3]

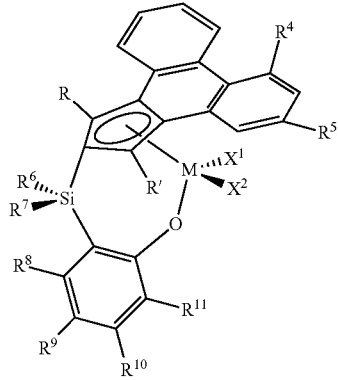

[Chemical Formula 4]

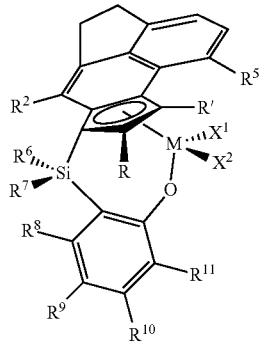

in Chemical Formulas 2 to 4, M, $R^6$, $R^7$, $R^8$, $R^9$, $R^{10}$, $R^{11}$, $X^1$ and $X^2$ are the same as defined in Chemical Formula 1 above; R, R', $R^2$, $R^3$, $R^4$ and $R^5$ are each independently hydrogen, (C1-C20)alkyl, (C6-C20)aryl, (C3-C20)cycloalkyl, halogen, (C2-C20)alkenyl, (C3-C20)heteroaryl, (C3-C20)heterocycloalkyl, —$OR^{a1}$, —$SR^{a2}$, —$NR^{a3}R^{a4}$ or —$PR^{a5}R^{a6}$; $R^{a1}$ to $R^{a6}$ are each independently (C1-C20)alkyl or (C6-C20)aryl; the alkyl, aryl, cycloalkyl, heteroaryl or heterocycloalkyl of R, R', $R^2$, $R^3$, $R^4$ and $R^5$ and the alkyl or aryl of $R^{a1}$ to $R^{a6}$ may be further substituted with at least one selected from the group consisting of halogen, (C1-C20)alkyl, halo(C1-C20)alkyl, (C1-C20)alkoxy, (C6-C20)aryl, (C6-C20)aryloxy, nitro, cyano, —$OSiR^{b1}R^{b2}R^{b3}$, —$SR^{b4}$, —$NR^{b5}R^{b6}$, and —$PR^{b7}R^{b8}$; $R^{b1}$ to $R^{b8}$ are each independently (C1-C20)alkyl, (C6-C20)aryl, (C6-C20)ar(C1-C20)alkyl, (C1-C20)alkyl(C6-C20)aryl or (C3-C20)cycloalkyl.

In an embodiment of the present invention, $R^{11}$ is (C1-C20)alkyl, and the alkyl of $R^{11}$ may be further substituted with at least one selected from the group consisting of halogen, (C1-C20)alkyl, halo(C1-C20)alkyl, (C6-C12)aryl, (C1-C10)alkyl(C6-C12)aryl, (C6-C12)aryl(C1-C10)alkyl, (C1-C10)alkoxy, (C6-C12)aryloxy, (C1-C10)alkylthio, (C6-C12)arylthio, di(C1-C10)alkylamino, di(C6-C12)arylamino, di(C1-C10)alkylphosphine and di(C6-C12) arylphosphine.

In an exemplary embodiment of the present invention, the transition metal compound represented by Chemical Formula 1 may be more preferably a transition metal compound represented by Chemical Formulas 5, 6 or 7 below:

[Chemical Formula 5]

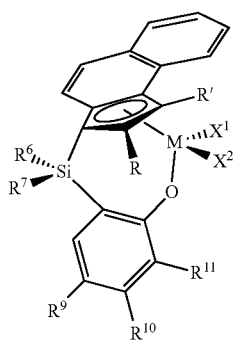

[Chemical Formula 6]

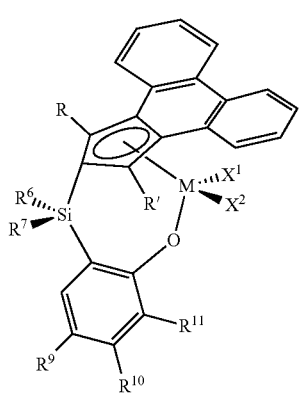

[Chemical Formula 7]

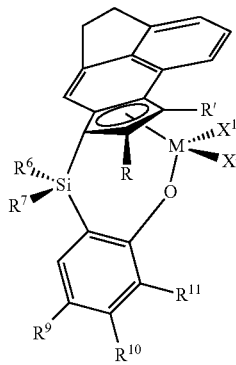

in Chemical Formulas 5 to 7, M, $X^1$ and $X^2$ are the same as defined in Chemical Formula 1 above; R and R' are each independently hydrogen, (C1-C20)alkyl or halo(C1-C20)alkyl; $R^6$ and $R^7$ are each independently (C1-C20)alkyl, halo(C1-C20)alkyl, (C6-C20)aryl or (C6-C20)aryl(C1-C20)alkyl; $R^9$ and $R^{10}$ are each independently hydrogen, (C1-C20)alkyl, halo(C1-C20)alkyl or halogen, or $R^9$ and $R^{10}$ may be linked via

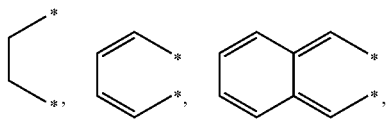 or 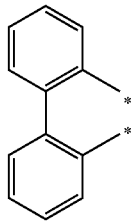

to form a fused ring; and $R^{11}$ is (C1-C20)alkyl.

In an exemplary embodiment of the present invention, M of the transition metal compound may be a transition metal of Group 4 in the periodic table, preferably titanium (Ti), zirconium (Zr) or hafnium (Hf), and may have an oxidation number of +2, +3 or +4.

In an exemplary embodiment of the present invention, $R^1$ to $R^5$ may be each independently hydrogen, methyl, ethyl, n-propyl, isopropyl, n-butyl, isobutyl, sec-butyl, tert-butyl, n-pentyl, neopentyl, amyl, n-hexyl, n-octyl, n-decyl, n-dodecyl, n-tetradecyl, n-hexadecyl, n-pentadecyl, phenyl, pyridyl, methoxy, ethoxy, butoxy, methylthio, ethylthio, dimethylamino, methylethylamino, diethylamino, diphenylamino, dimethylphosphine, diethylphosphine or diphenylphosphine, and the $R^2$ to $R^4$ may be linked to an adjacent substituent via

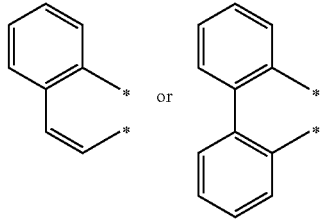

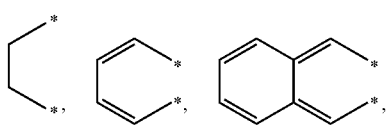

to form a fused ring.

In an exemplary embodiment of the present invention, $R^1$ to $R^5$ may be each independently hydrogen, (C1-C20)alkyl, (C1-C20)alkoxy or di(C1-C20)alkylamino, preferably, $R^1$ may be hydrogen or (C1-C10)alkyl, (C1-C10)alkoxy or di(C1-C10)alkylamino, $R^2$ to $R^5$ may be each independently hydrogen or (C1-C10)alkyl, or the $R^2$ to $R^4$ may be linked to an adjacent substituent via

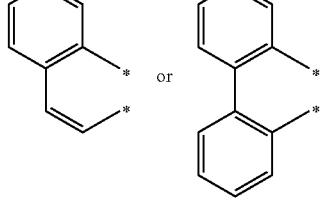

to form a fused ring, and m is an integer of 1 or 2.

In an exemplary embodiment of the present invention, $R^1$ may be hydrogen, methyl, ethyl, n-propyl, isopropyl, n-butyl, isobutyl, sec-butyl, tert-butyl, methoxy, ethoxy, butoxy, dimethylamino, methylethylamino or diethylamino, m is an integer of 1 or 2, $R^2$ to $R^5$ may be each independently hydrogen, ethyl, n-propyl, isopropyl, n-butyl, isobutyl, sec-butyl or tert-butyl, or the $R^2$ and $R^3$ may be linked via

to form a fused ring, and the $R^2$ and $R^4$ may be linked via

to form a fused ring.

In an exemplary embodiment of the present invention, $R^1$ may be hydrogen, and $R^2$ and $R^3$ may be linked via

to form a fused ring.

In an exemplary embodiment of the present invention, $R^1$ may be (C1-C10)alkyl, (C1-C20)alkoxy or di(C1-C10)alkylamino, and $R^2$ to $R^5$ may be each independently hydrogen or (C1-C10)alkyl.

In an embodiment of the present invention, $R^1$ is (C1-C10)alkyl, (C1-C10)alkoxy or di(C1-C10)alkylamino, and $R^3$ and $R^4$ may be linked via

to form a fused ring.

In an exemplary embodiment of the present invention, $R^1$ may be methyl, ethyl, n-propyl, isopropyl, n-butyl, isobutyl, sec-butyl, tert-butyl, methoxy, ethoxy, butoxy, dimethylamino, methylethylamino or diethylamino, and $R^2$ and $R^5$ may be each independently hydrogen, ethyl, n-propyl, isopropyl, n-butyl, isobutyl, sec-butyl or tert-butyl.

In an exemplary embodiment of the present invention, $R^6$ and $R^7$ may be each independently methyl, ethyl, n-propyl, isopropyl, n-butyl, isobutyl, sec-butyl, tert-butyl, n-pentyl, neopentyl, amyl, n-hexyl, n-octyl, n-decyl, n-dodecyl, n-tetradecyl, n-hexadecyl, n-pentadecyl, fluoromethyl, trifluoromethyl, perfluoroethyl, perfluoropropyl, cyclopropyl, cyclobutyl, cyclopentyl, cyclohexyl, cycloheptyl, cyclooctyl, phenyl, tolyl, xylyl, trimethylphenyl, tetramethylphenyl, pentamethylphenyl, ethylphenyl, n-propylphenyl, isopropylphenyl, n-butylphenyl, sec-butylphenyl, tert-butylphenyl, n-pentylphenyl, neopentylphenyl, n-hexylphenyl, n-octylphenyl, n-decylphenyl, n-dodecylphenyl, biphenyl, fluorenyl, triphenyl, naphthyl, anthracenyl, benzyl, naphthylmethyl, anthracenylmethyl, pyridyl, methoxy, ethoxy, methylthio, ethylthio, dimethylamino, methylethylamino, diethylamino, diphenylamino, dimethylphosphine, diethylphosphine or diphenylphosphine, or the $R^6$ and $R^7$ may be linked via butylene or pentylene to form a ring.

In an exemplary embodiment of the present invention, $R^6$ and $R^7$ may be each independently (C1-C20)alkyl, preferably (C1-C10)alkyl, halo(C1-C20)alkyl, preferably halo(C1-C10)alkyl or (C6-C20)aryl, preferably (C6-C12)aryl or (C6-C20)aryl(C1-C20)alkyl, and preferably (C6-C12)aryl(C1-C10)alkyl.

In an exemplary embodiment of the present invention, $R^6$ and $R^7$ may be each independently methyl, ethyl, phenyl or benzyl.

In an exemplary embodiment of the present invention, $R^8$ to $R^{10}$ may be each independently hydrogen, methyl, ethyl, n-propyl, isopropyl, n-butyl, isobutyl, sec-butyl, tert-butyl, n-pentyl, neopentyl, amyl, n-hexyl, n-octyl, n-decyl, n-dodecyl, n-tetradecyl, n-hexadecyl, n-pentadecyl, fluoromethyl, trifluoromethyl, perfluoroethyl, perfluoropropyl, chloro, fluoro, bromo, phenyl, biphenyl, fluorenyl, triphenyl, naphthyl, anthracenyl, benzyl, naphthylmethyl, anthracenylmethyl, pyridyl, methoxy, ethoxy, methylthio, ethylthio, dimethylamino, methylethylamino, diethylamino, diphenylamino, dimethylphosphine, diethylphosphine or diphenylphosphine, or the $R^9$ and $R^{10}$ may be linked via

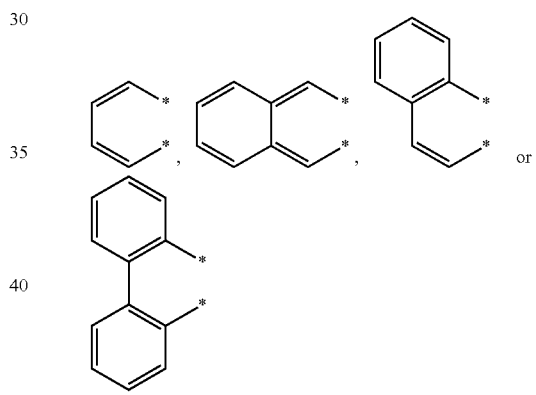

to form a fused ring.

In an exemplary embodiment of the present invention, $R^8$ to $R^{10}$ may be each independently hydrogen, (C1-C20)alkyl, preferably (C1-C10)alkyl, halo(C1-C20)alkyl, and preferably halo(C1-C10)alkyl or halogen.

In an exemplary embodiment of the present invention, $R^8$ to $R^{10}$ may be each independently hydrogen, methyl, ethyl, tert-butyl or fluoro.

In an exemplary embodiment of the present invention, $R^8$ may be hydrogen, and $R^9$ and $R^{10}$ may be each independently hydrogen, (C1-C20)alkyl, preferably (C1-C10)alkyl, halo(C1-C20)alkyl, and preferably halo(C1-C10)alkyl or halogen, and the $R^9$ and $R^{10}$ may be linked via

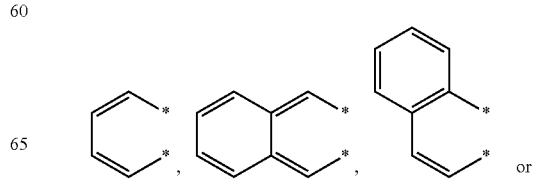

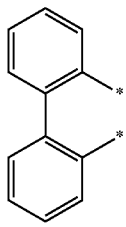

to form a fused ring.

In an exemplary embodiment of the present invention, $R^8$ and $R^{10}$ may be hydrogen, $R^9$ may be (C1-C10)alkyl or halogen, or the $R^9$ and $R^{10}$ may be linked via

to form a fused ring.

In an exemplary embodiment of the present invention, $R^8$ and $R^{10}$ may be hydrogen, $R^9$ may be methyl, ethyl, tert-butyl or fluoro, and the $R^9$ and $R^{10}$ may be linked via

to form a fused ring.

In an embodiment of the present invention, $R^{11}$ may be (C1-C10)alkyl, preferably (C3-C10)alkyl, and more preferably $R^{11}$ may be methyl, ethyl, n-propyl, isopropyl, n-butyl, isobutyl, sec-butyl, tert-butyl, n-pentyl, neopentyl, amyl, n-hexyl or n-octyl.

In an exemplary embodiment of the present invention, $X^1$ and $X^2$ may be each independently fluoro, chloro, bromo, methyl, ethyl, isopropyl, amyl, cyclopropyl, cyclobutyl, cyclopentyl, cyclohexyl, phenyl, naphthyl, benzyl, methoxy, ethoxy, isopropoxy, tert-butoxy, phenoxy, 4-tert-butylphenoxy, trimethylsiloxy, tert-butyldimethylsiloxy, dimethylamino, diphenylamino, dimethylphosphine, diethylphosphine, diphenylphosphine, ethylthio or isopropylthio.

In an exemplary embodiment of the present invention, $X^1$ and $X^2$ may be (C1-C20)alkyl, preferably (C1-C10)alkyl or halogen, and more preferably, $X^1$ and $X^2$ may be (C1-C10)alkyl.

In an exemplary embodiment of the present invention, $X^1$ and $X^2$ may be methyl or chloro, and preferably, methyl.

In an exemplary embodiment of the present invention, the transition metal compound may be selected from compounds having the following structures, but is not limited thereto:

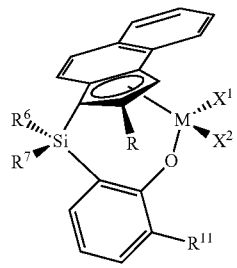

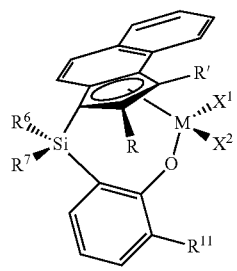

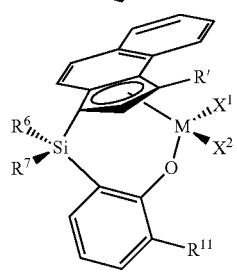

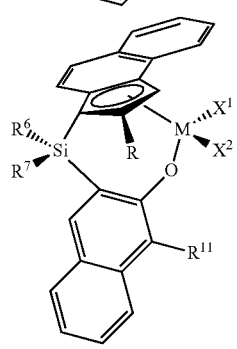

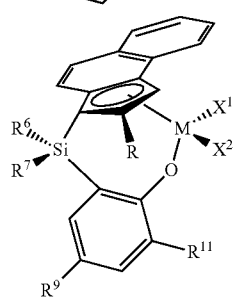

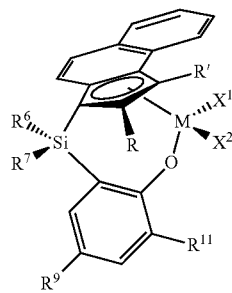

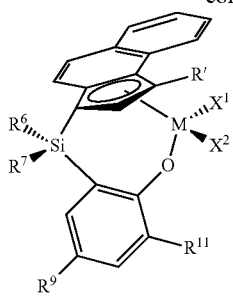

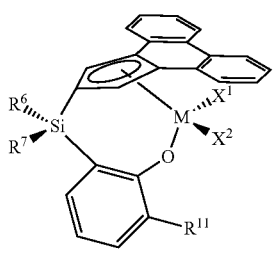

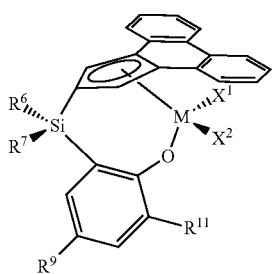

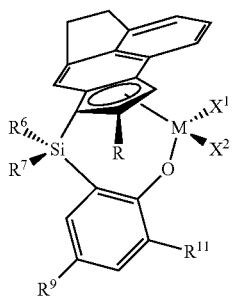

M is titanium (Ti), zirconium (Zr) or hafnium (Hf); R and R' are each independently (C1-C20)alkyl or halo(C1-C20)alkyl; $R^6$ and $R^7$ are each independently (C1-C20)alkyl, halo(C1-C20)alkyl, (C6-C20)aryl or (C6-C20)aryl(C1-C20)alkyl; $R^9$ is (C1-C20)alkyl, halo(C1-C20)alkyl or halogen; $R^{11}$ is (C1-C20)alkyl; $X^1$ and $X^2$ are (C1-C20)alkyl or halogen.

In an exemplary embodiment of the present invention, more specifically, the transition metal compound may be selected from compounds having the following structures, but is not limited thereto:

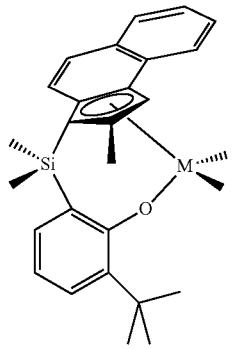

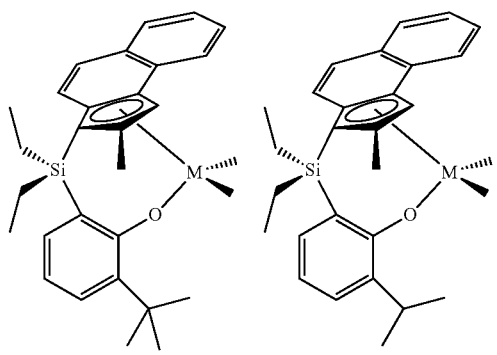

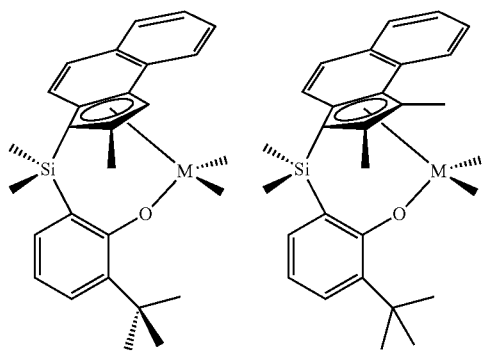

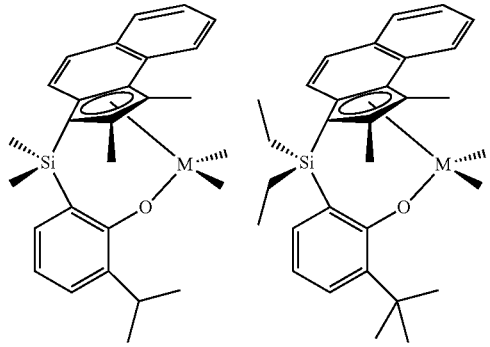

-continued
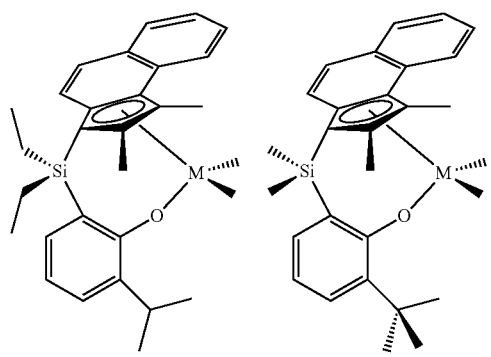
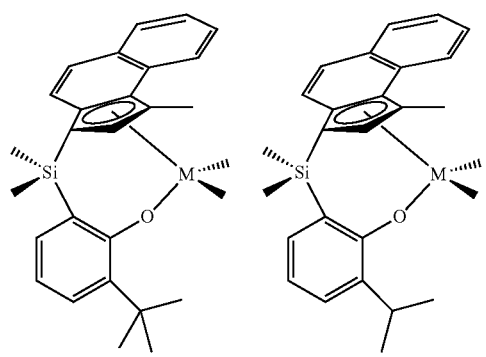
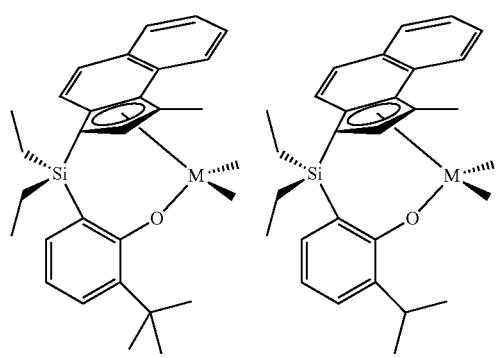
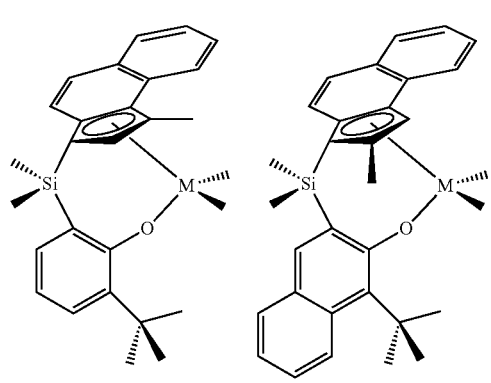
-continued
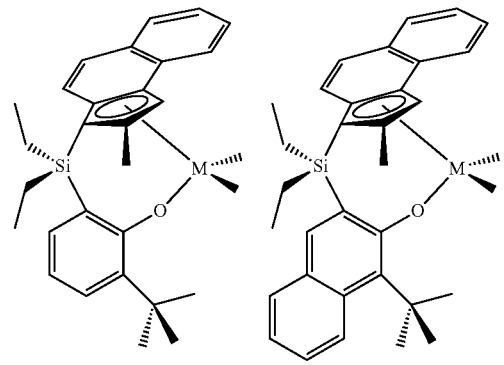
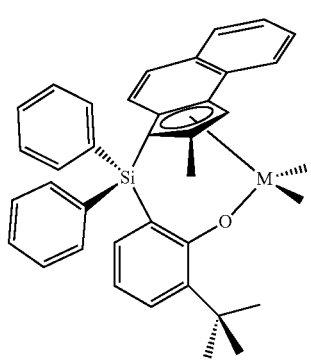
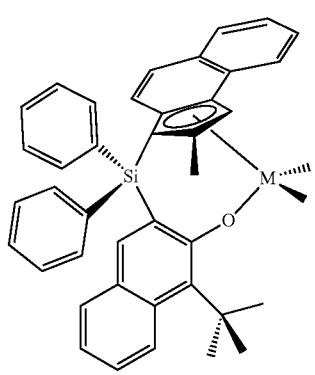
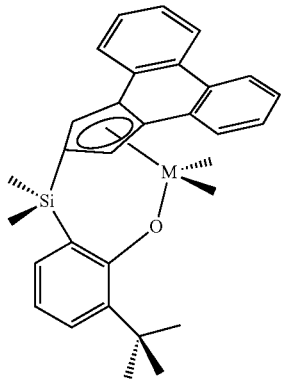

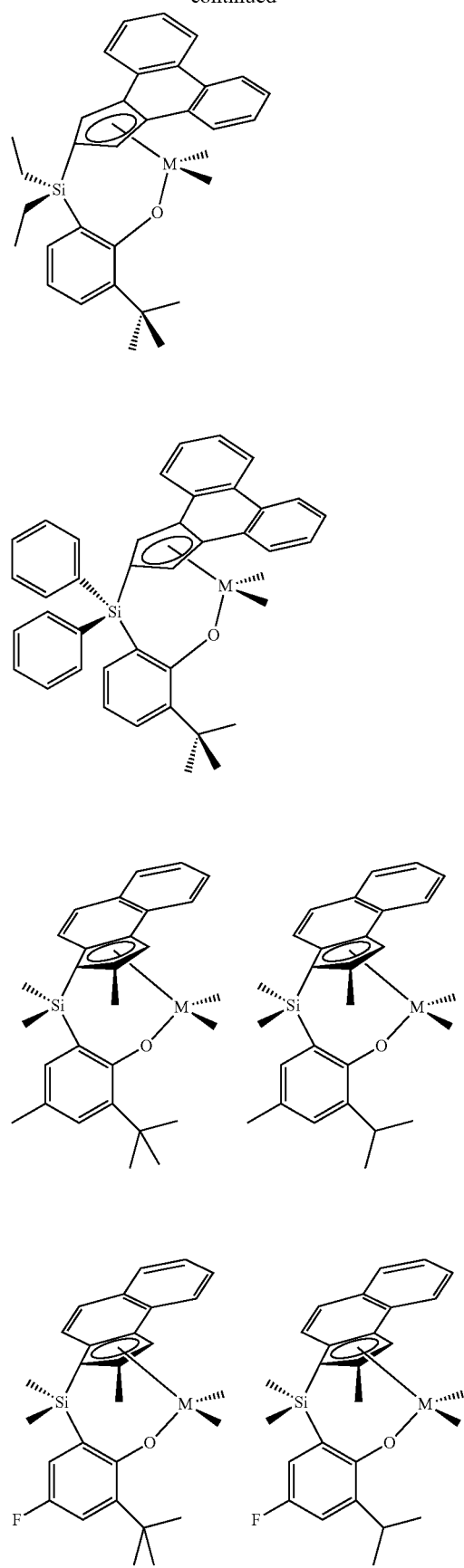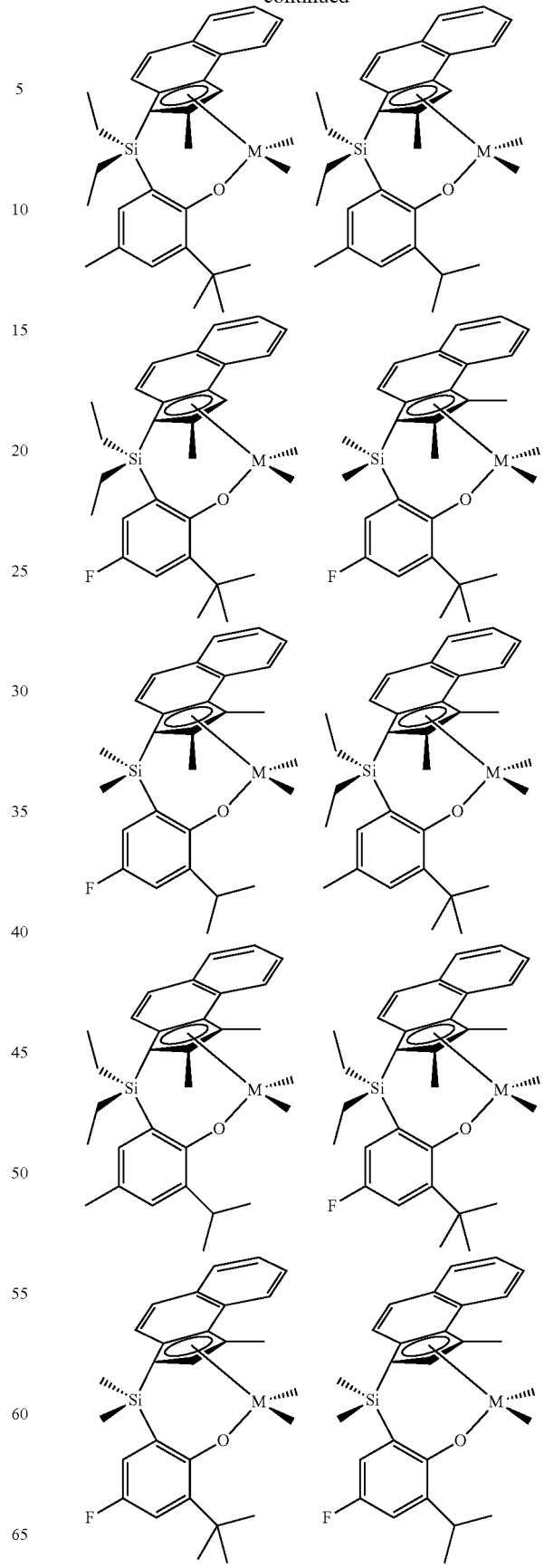

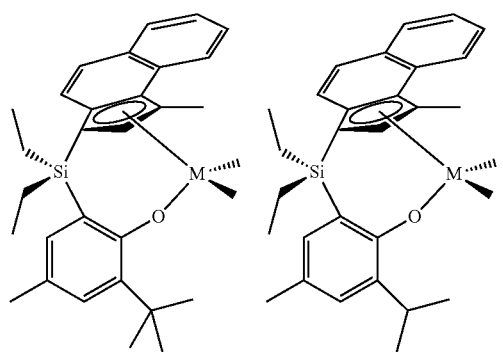
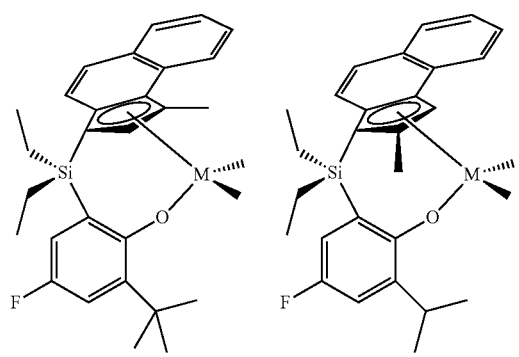
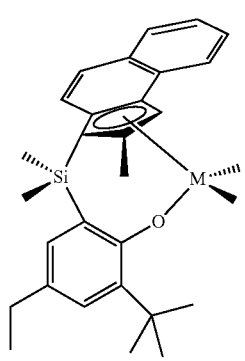
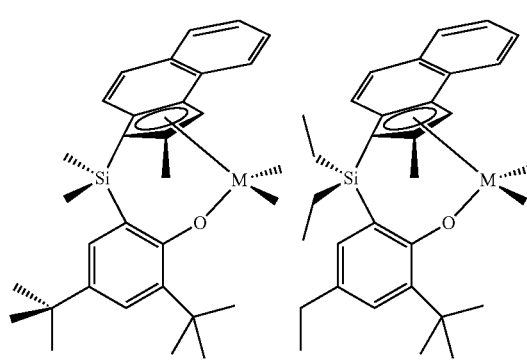
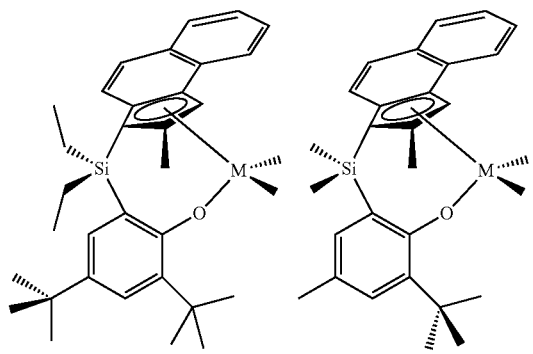
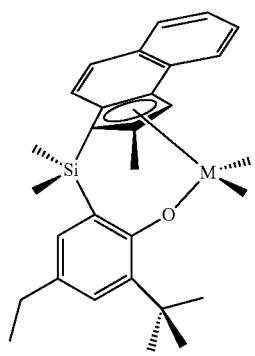
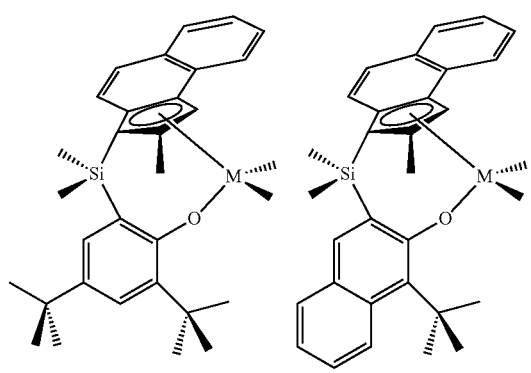
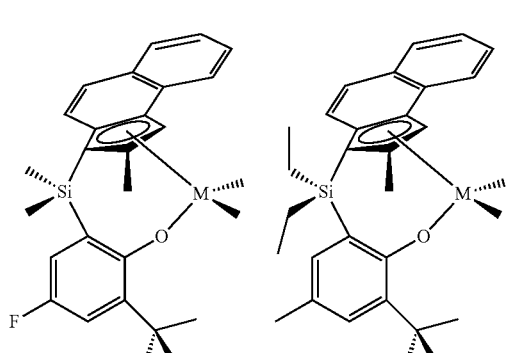

23
-continued
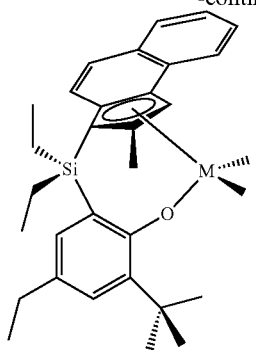
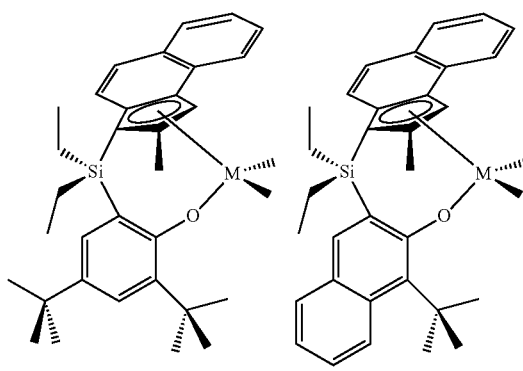
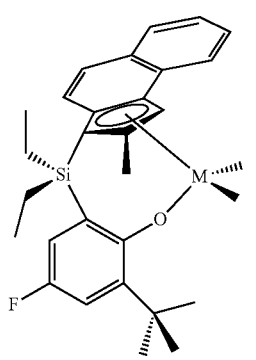
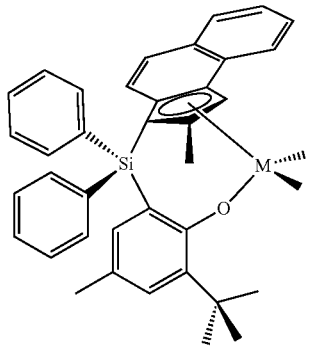
24
-continued
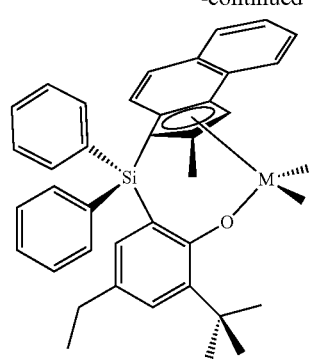
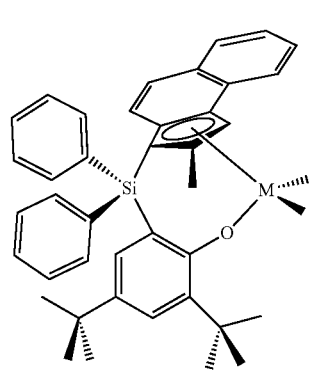
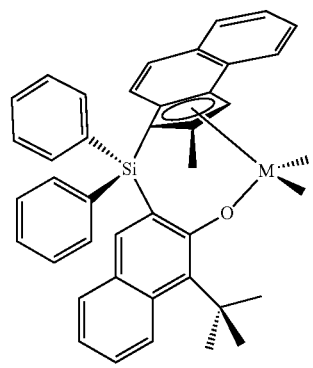
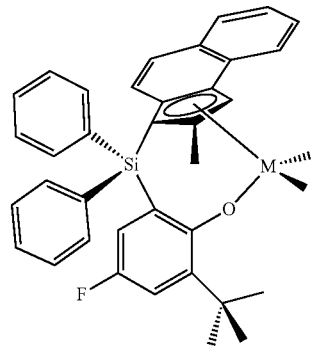

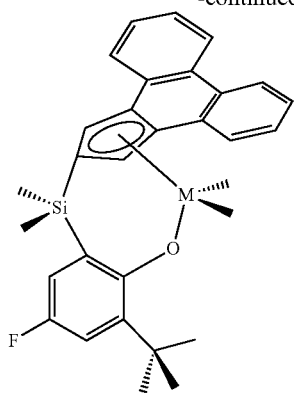
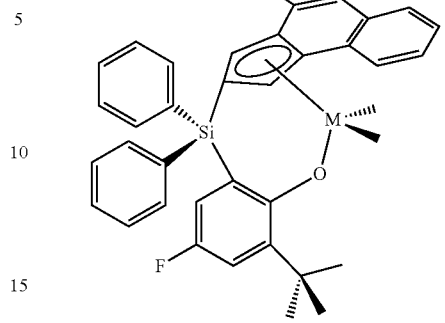
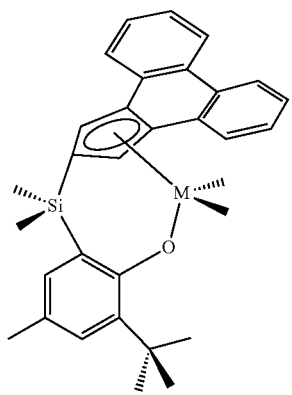
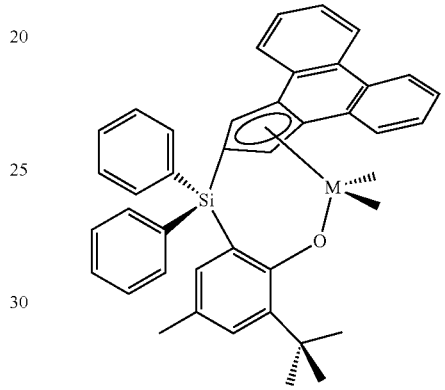
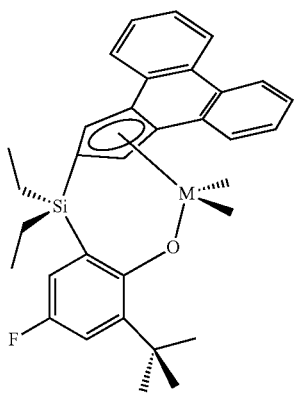
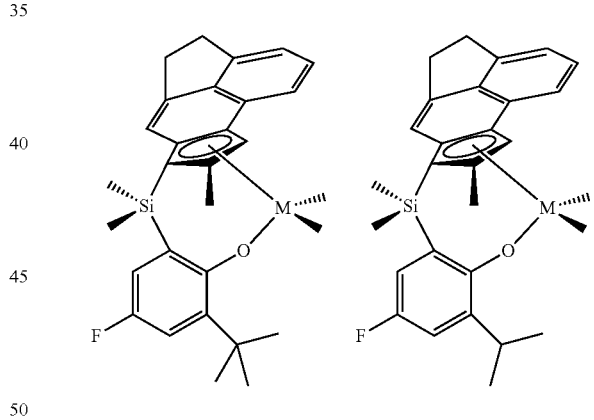
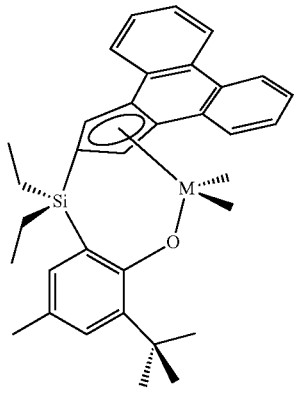
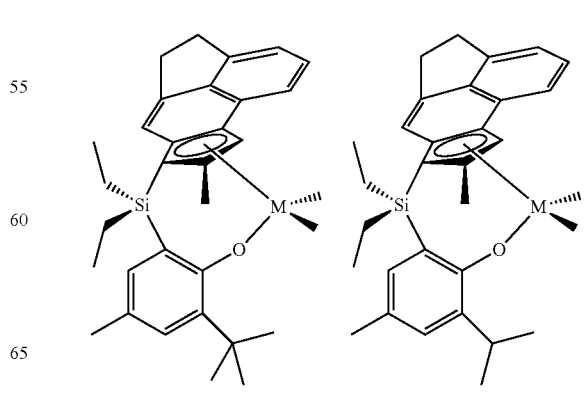

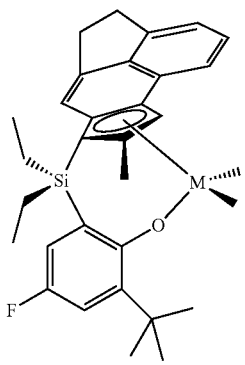

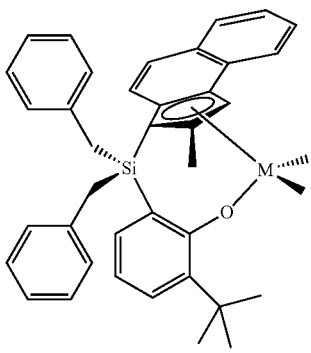

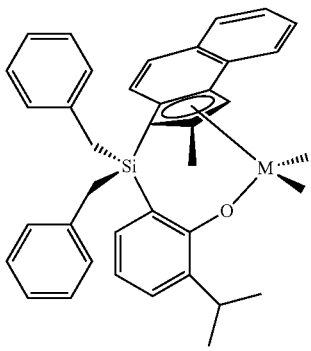

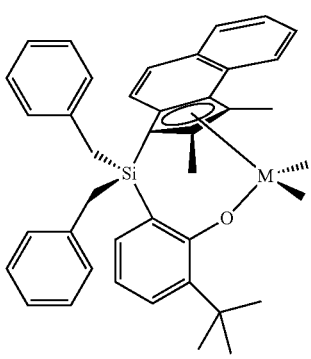

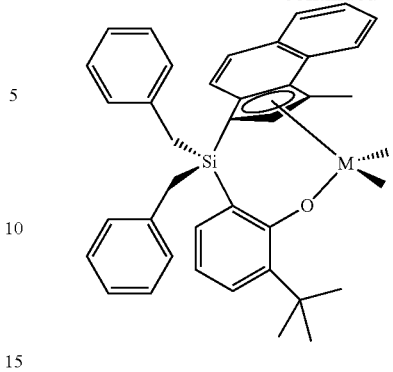

wherein M is titanium, zirconium or hafnium.

Meanwhile, in order to prepare an active catalyst component used in the preparation of an ethylene-based polymer selected from the ethylene homopolymer and the copolymer of ethylene and α-olefin by using the transition metal compound according to the present invention, preferably, the transition metal compound may function together with a cocatalyst selected from an aluminum compound, a boron compound, or a mixture thereof capable of acting as a counter ion having a weak binding force while actionizing the central metal, i.e., an anion, by extracting $X^1$ and $X^2$ ligands in the transition metal complex, and the catalyst composition comprising the transition metal compound and the cocatalyst is also within the scope of the present invention.

In the catalyst composition according to the exemplary embodiment of the present invention, the aluminum compound that is usable as the cocatalyst may be specifically one or two or more selected from an aluminoxane compound represented by Chemical Formula 8 or 9, an organoaluminum compound represented by Chemical Formula 8, or an organoaluminum oxide compound represented by Chemical Formula 10 or 11:

| | |
|---|---|
| $(-Al(R^{51})-O-)n$ | [Chemical Formula 8] |
| $(R^{51})_2Al-(-O(R^{51})-)q-(R^{51})_2$ | [Chemical Formula 9] |
| $(R^{52})_rAl(E)_{3-r}$ | [Chemical Formula 10] |
| $(R53)_2AlOR54$ | [Chemical Formula 11] |
| $R^{53}Al(OR^{54})_2$ | [Chemical Formula 12] | in Chemical Formulas 8 to 12, $R^{51}$ is (C1-C20)alkyl, preferably methyl or isobutyl, n and q are each independently an integer of 5 to 20; $R^{52}$ and $R^{53}$ are each independently (C1-C20)alkyl; E is hydrogen or halogen; r is an integer of 1 to 3; and $R^{54}$ is (C1-C20)alkyl or (C6-C20)aryl.

Specific examples of the aluminum compound may include methylaluminoxane, modified methylaluminoxane, and tetraisobutylaluminoxane as aluminoxane compounds; examples of the organoaluminum compound may include trialkylaluminum including trimethylaluminum, triethylaluminum, tripropylaluminum, triisobutylaluminum, and trihexylaluminum, dialkylaluminumchloride including dimethylaluminum chloride, diethylaluminum chloride, dipropylaluminum chloride, diisobutylaluminum chloride, and dihexylaluminum chloride, alkylaluminum dichloride including methyl aluminum dichloride, ethyl aluminum dichloride, propyl aluminum dichloride, isobutyl aluminum dichloride, and hexyl aluminum dichloride, and dialkylaluminum hydride including dimethyl aluminum hydride, diethyl aluminum hydride, dipropyl aluminum hydride, diisobutyl aluminum hydride, and dihexyl aluminum hydride.

In an exemplary embodiment of the present invention, the aluminum compound may be preferably one or a mixture of two or more selected from alkyl aluminoxane compound and trialkyl aluminum. More preferably, the aluminum compound may be one or a mixture of two or more selected from methylaluminoxane, modified methylaluminoxane, tetraisobutylaluminoxane, trimethylaluminum, triethylaluminum, trioctylaluminum, and triisobutylaluminum.

The boron compound that is usable as the cocatalyst in the present invention is known from U.S. Pat. No. 5,198,401 and may be selected from boron compounds represented by Chemical Formulas 13 to 15 below:

$B(R^{41})_3$ [Chemical Formula 13]

$[R42]+[B(R41)_4]-$ [Chemical Formula 14]

$[(R43)_pZH]+[B(R41)_4]-$ [Chemical Formula 15]

in Chemical Formulas 13 to 15, B is a boron atom; $R^{41}$ is phenyl, and the phenyl may be further substituted with 3 to 5 substituents selected from fluoro, (C1-C20)alkyl unsubstituted or substituted with fluoro, and (C1-C20)alkoxy unsubstituted or substituted with fluoro; $R^{42}$ is (C5-C7) aromatic radical or (C1-C20)alkyl(C6-C20)aryl radical, (C6-C20)aryl(C1-C20)alkyl radical, such as triphenylmethylium radical; Z is a nitrogen atom or a phosphorus atom; and $R^{43}$ is (C1-050)alkyl radical or an anilinium radical substituted with two (C1-C10)alkyls together with a nitrogen atom; and p is an integer of 2 or 3.

Preferable examples of the boron-based cocatalyst may include tris(pentafluorophenyl)borane, tris(2,3,5,6-tetrafluorophenyl)borane, tris(2,3,4,5-tetrafluorophenyl)borane, tris (3,4,5-trifluorophenyl)borane, tris(2,3,4-trifluorophenyl)borane, phenylbis(pentafluorophenyl)borane, tetrakis (pentafluorophenyl)borate, tetrakis(2,3,5,6-tetrafluorophenyl)borate, tetrakis(2,3,4,5-tetrafluorophenyl) borate, tetrakis(3,4,5-tetrafluorophenyl)borate, tetrakis(2,2, 4-trifluorophenyl)borate, phenylbis(pentafluorophenyl) borate, or tetrakis(3,5-bistrifluoromethylphenyl)borate. Examples of specific combinations thereof include ferrocenium tetrakis(pentafluorophenyl)borate, 1,1'-dimethylferrocenium tetrakis(pentafluorophenyl)borate, tetrakis(pentafluorophenyl)borate, triphenylmethylium tetrakis (pentafluorophenyl)borate, triphenylmethyl tetrakis(3,5-bistrifluoromethylphenyl)borate, triethylammonium tetrakis (pentafluorophenyl)borate, tripropylammonium tetrakis (pentafluorophenyl)borate, tri(n-butyl) ammonium tetrakis (pentafluorophenyl)borate, tri(n-butyl)ammonium tetrakis (3,5-bistrifluoromethylphenyl)borate, N,N-dimethyl anilinium tetrakis(pentafluorophenyl) borate, N,N-diethylanilinium tetrakis(pentafluorophenyl)borate, N,N-2,4,6-pentamethylanilinium tetrakis(pentafluorophenyl)borate, N,N-dimethylanilinium tetrakis(3,5-bistrifluoromethylphenyl) borate, diisopropylammonium tetrakis(pentafluorophenyl) borate, dicyclohexylammonium tetrakis(pentafluorophenyl) borate, triphenylphosphonium tetrakis(pentafluorophenyl) borate, tri(methylphenyl)phosphonium tetrakis (pentafluorophenyl)borate, or tri(dimethylphenyl) phosphonium tetrakis(pentafluorophenyl)borate, and among them, the most preferred is N,N-dimethylanilinium tetrakis (pentafluorophenyl)borate, triphenylmethylium tetrakis (pentafluorophenyl)borate or tris(pentafluorophenyl)borane.

Meanwhile, the cocatalyst may serve as a scavenger for removing impurities acting as a poison to the catalyst in reactants.

In an exemplary embodiment of the present invention, when the aluminum compound is used as the cocatalyst, the ratio between the transition metal compound and the cocatalyst of the present invention may have a preferable range of a molar ratio of the transition metal (M):aluminum atom (Al) of 1:10 to 5,000.

In an exemplary embodiment of the present invention, when the aluminum compound and the boron compound are simultaneously used as the cocatalyst, the ratio between the transition metal compound and the cocatalyst of the present invention may have a preferable range of a molar ratio of the transition metal (M):boron atom (B):aluminum atom (Al) of 1:0.1 to 100:10 to 3,000, and more preferably, 1:0.5 to 5:100 to 3,000.

When the ratio between the transition metal compound and the cocatalyst of the present invention is out of the above-described range, since an amount of the cocatalyst is relatively small, the transition metal compound may not be completely activated, and thus a catalytic activity of the transition metal compound may not be sufficient, or the cocatalyst is used in an amount exceeding the required amount, causing a problem in that a preparation cost largely increases. Within the above-described range, excellent catalytic activity for preparing the ethylene homopolymer or the copolymer of ethylene and α-olefin is exhibited, and the range of the ratio varies depending on purity of the reaction.

As another aspect of the present invention, the method for preparing an ethylene polymer using the transition metal catalyst composition may be performed by contacting the transition metal catalyst, the cocatalyst, and ethylene or optionally α-olefin comonomer in the presence of a suitable organic solvent. Here, the transition metal catalyst and the cocatalyst component may be separately introduced into the reactor, or the respective components may be previously mixed and added into the reactor, wherein there is no particular limitation on a mixing condition such as the order of introduction, temperature, concentration, or the like.

A preferred organic solvent that is usable in the preparation method may be (C3-C20)hydrocarbon, and specific examples thereof may include butane, isobutane, pentane, hexane, heptane, octane, isooctane, nonane, decane, dodecane, cyclohexane, methylcyclohexane, benzene, toluene, xylene, and the like.

In an embodiment of the present invention, the polymerization may be performed in a slurry, liquid, vapor or bulk phase, but since the catalyst composition is present in a homogeneous form in the polymerization reactor, it is preferable to apply the catalyst composition to a solution polymerization process performed at a melting point of the corresponding polymer or more.

In an embodiment of the present invention, the polymerization may be performed in a batch, semi-continuous or continuous reaction, preferably in the continuous manner.

A pressure in a reactor for an ethylene homopolymerization or copolymerization of ethylene monomer with α-olefin may be 1 to 10,000 atm, more preferably 10 to 150 atm. A temperature for the polymerization reaction is effectively 20 to 400° C., preferably 50 to 260° C., and more preferably 100 to 200° C. However, the temperature and pressure conditions of the polymerization step may be determined in consideration of the efficiency of the polymerization reaction depending on the kind of the reaction and the type of reactor to be applied.

When preparing the ethylene homopolymer, ethylene is used alone as a monomer, and when preparing the copolymer of ethylene and α-olefin, at least one selected from C3-C18 α-olefins, C5-C20 cycloolefins, styrene and derivatives of styrene may be used as the comonomer together with ethylene. A preferable example of C3-C18 α-olefin may be selected from the group consisting of propylene, 1-butene, 1-pentene, 4-methyl-1-pentene, 1-hexene, 1-octene, 1-decene, 1-undecene, 1-dodecene, 1-tetradecene, 1-hexadecene and 1-octadecene, and a preferable example of C5-C20 cycloolefins may be selected from the group consisting of cyclopentene, cyclohexene, norbornene and phenylnorbornene. The styrene and derivatives thereof may be selected from styrene, alpha-methylstyrene, p-methylstyrene and 3-chloromethylstyrene. In the present invention, ethylene may be homopolymerized with the above-described olefin or may be copolymerized with two or more kinds of olefins. More preferably 1-butene, 1-hexene, 1-octene or 1-decene may be copolymerized with ethylene. In this case, the preferable pressure of ethylene and the preferable polymerization reaction temperature may be the same as in the preparation of the ethylene homopolymer, and the copolymer prepared according to the method of the present invention usually contains 30 wt % or more of ethylene, preferably 60 wt % or more of ethylene, and more preferably 60 to 99 wt % of ethylene.

As described above, the polymer prepared using the catalyst of the present invention and using ethylene and C3 to C18 α-olefin as a comonomer may have a molecular weight distribution (Mw/Mn) of 1.5 to 4.0 and a number average molecular weight (Mn) of 1,000 g/mol or more, and preferably 5,000 to 1,000,000 g/mol.

In an embodiment of the present invention, a high molecular weight ethylene homopolymer or copolymer of ethylene and α-olefin having a desired density according to the polymerization reaction temperature may be prepared.

Particularly, when the polymerization reaction temperature is lower than 180° C., preferably 130° C. or more to less than 180° C., a high molecular weight and low density ethylene homopolymer or copolymer of ethylene and α-olefin may be prepared, and specifically, may have a number average molecular weight of 1,000 g/mol or more, preferably 5,000 to 300,000 g/mol, more preferably 10,000 to 150,000 g/mol and an ultralow density of less than 0.900 g/cc, preferably a density of 0.850 g/cc or more to less than 0.900 g/cc.

In addition, when the polymerization reaction temperature is 180° C. or more, preferably 180° C. to 200° C., a high molecular weight and high density ethylene homopolymer or copolymer of ethylene and α-olefin may be prepared, and specifically, may have a number average molecular weight of 1,000 g/mol or more, preferably 5,000 to 1,000,000 g/mol, more preferably 10,000 to 300,000 g/mol and a high density of 0.900 g/cc or more, preferably a density of 0.900 g/cc to 0.980 g/cc.

In addition, when the ethylene homopolymer or copolymer according to the present invention is prepared, hydrogen may be used as a molecular weight regulator in order to regulate the molecular weight.

Since the catalyst composition presented in the present invention exists in a homogeneous state in the polymerization reactor, the catalyst composition may be preferably employed in a solution polymerization process carried out at a temperature higher than the melting point of the corresponding polymer. However, as disclosed by U.S. Pat. No. 4,752,597, the transition metal compound and cocatalyst may be supported on a porous metal oxide supporter, to thereby be used for slurry polymerization or a gas phase polymerization process, as a heterogeneous catalyst composition.

Hereinafter, the present invention is described in detail with reference to the following Examples. However, the scope of the present invention is not limited by the Examples below.

All ligand and catalyst synthesis experiments were performed under a nitrogen atmosphere by using a standard Schlenk technology or a glove box technology, and organic solvents used in the reaction were subjected to reflux under sodium metal and benzophenone to remove moisture, followed by distillation before use, except as otherwise noted. $^1$H-NMR analysis of the synthesized ligand and catalyst was performed by using a Bruker 500 MHz at room temperature.

Before use, cyclohexane, as solvent for polymerization, was passed through a tube filled with molecular sieve 5 Å and activated alumina, and bubbled by high-purity nitrogen, to thereby sufficiently remove moisture, oxygen and other catalyst poison materials. The polymerized polymers were analyzed by the measurement methods described below.

1. Molecular Weight and Molecular Weight Distribution

Measurement was conducted at 135° C. at a rate of 1.0 mL/min in the presence of 1,2,3-trichlorobenzene solvent, by using Freeslate Rapid GPC, and molecular weight was calibrated by using PL polystyrene standards.

2. Content of α-Olefin (Mol %) in Copolymer

The content of α-olefin was measured in a $^{13}$C-NMR mode at 120° C. using a 1,2,4-trichlorobenzene/$C_6D_6$ (weight fraction of 7/3) mixed solvent at 125 MHz using a Bruker Avance 400 nuclear magnetic resonance spectrometer. (See Randal, J. C. *JMS-Rev. Macromol. Chem. Phys.* 1980, C29, 201)

The ratio between ethylene and α-olefin in the copolymer was quantified using an infrared spectrometer.

3. Melt index (MI2.16): The melt index was measured at 190° C. under a load of 2.16 kg by the ASTM D1238 analysis method.

4. Density: The density was measured by the ASTM D792 analysis method.

Example 1

Preparation of Transition Metal Catalyst 1 According to the Present Invention

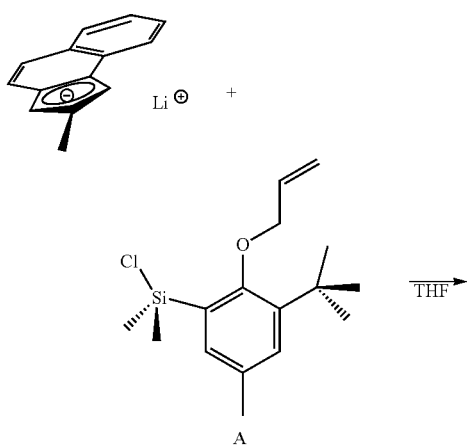

A

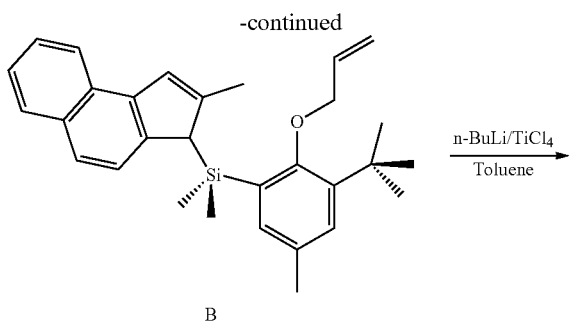

B

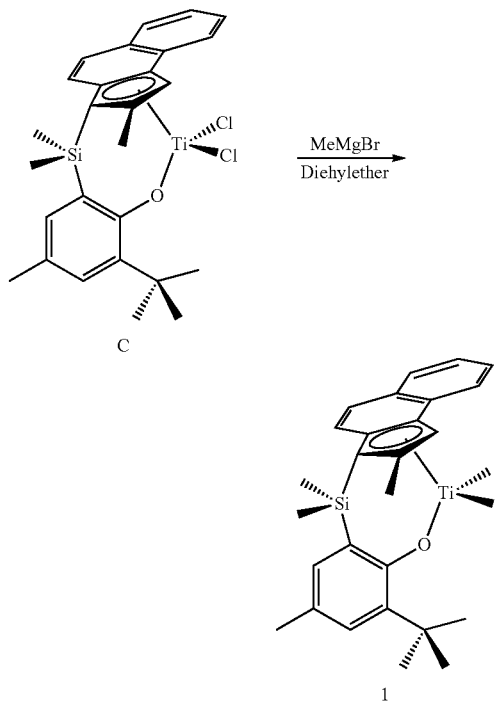

C

1

Preparation of [2-allyloxy-3-tertbutyl-5-methylphenyl](dimethyl)(2-methyl-3H-cyclopenta[a]naphthalen-3-yl) silane (Compound B)

[2-(Allyloxy)-3-tert-butyl-5-methylphenyl](chloro)dimethylsilane (Compound A) was synthesized with reference to the synthesis contents described in the paper [J. Organomet. Chem., 2007, 692, 4059-4066)].

2-Methyl-9bH-cyclopenta[a]naphthalene (30.08 mmol) was added to THF (112 mL) and then a hexane solution of n-BuLi (2.5 M, 31.58 mmol) was slowly added at −78° C. After the addition of n-BuLi was completed, a temperature was slowly raised to room temperature and then the mixture was stirred for 2 hours. After the stirring was completed, the mixture was cooled to −78° C., a toluene (14 mL) solution of the [2-(allyloxy)-3-tert-butyl-5-methylphenyl](chloro)dimethylsilane (Compound A, 33.09 mmol) was slowly added dropwise, and then the temperature of the reaction mixture was raised to room temperature. After further stirring at room temperature for 3 hours, the reaction mixture was added to distilled water (200 mL) to terminate the reaction. The organic layer was extracted with toluene (2×50 mL), moisture was removed with $Na_2SO_4$, and the solvent was removed by vacuum distillation apparatus to obtain a yellow residue in an oil form. Then, the residue was purified by flash chromatography (eluent: dichloromethane/hexane of 1:10 vol) using a column filled with silica gel 60 (40-63 μm) to obtain a compound B as the title compound (yield: 62%).

$^1$H NMR ($CDCl_3$): δ 8.17 (m, 1H), 7.92 (m, 1H), 7.45-7.56 (m, 3H), 7.34 (m, 1H), 7.31 (m, 1H), 7.20 (m, 1H), 7.11 (m, 1H), 6.14 (m, 1H), 5.66 (m, 1H), 5.39 (m, 1H), 4.54 (m, 2H), 4.30 (m, 1H), 2.37 (s, 3H), 2.08 (s, 3H), 1.54 (s, 9H), 0.32 (s, 3H), 0.08 (s, 3H).

Preparation of dimethylsilylene(2-methylcyclopenta[a]naphthalen-3-yl)-2-tertbutyl-4-methylphenoxy) dichloro titanium (Compound C)

Toluene (70 mL) in which Compound B (10 mmol) and $Et_3N$ (45 mmol) were dissolved was cooled to −78° C. and a hexane solution of n-BuLi (2.5 M, 22 mmol) was added thereto. After the addition of n-BuLi was completed, the reaction mixture was raised to room temperature and stirred at room temperature for 20 hours. After the reaction mixture was cooled again to −78° C., a solution of $TiCl_4$ (15 mmol) in toluene (22 mL) was slowly added dropwise. After the addition of $TiCl_4$ was completed, the reaction mixture was warmed to room temperature and stirred at 90° C. for 16 hours. The temperature of the reaction mixture was cooled to room temperature and the solvent was removed by vacuum under a nitrogen atmosphere. After the solvent was removed, hot methylcyclohexane was added and the filtrate was obtained through a filter filled with Celite 503. The resulting filtrate was dried in vacuo and then dissolved in a mixed solvent of methylcyclohexane and hexane to obtain the title compound C in the form of a reddish-brown solid (yield: 58%) at −30° C.

$^1$H NMR ($CD_2Cl_2$): δ 8.35 (m, 1H), 7.83 (m, 1H), 7.74 (m, 1H), 7.66 (m, 2H), 7.51 (m, 1H), 7.37 (m, 1H), 7.30 (m, 1H), 7.21 (m, 1H), 2.47 (s, 3H), 2.41 (s, 3H), 1.25 (s, 9H), 0.75 (s, 3H), 0.69 (s, 3H).

Preparation of dimethylsilylene(2-methylcyclopenta[a]naphthalen-3-yl)-2-tertbutyl-4-methylphenoxy) dimethyl titanium (Compound 1)

The Ti compound C in the form of dichloride was dissolved in diethyl ether (100 mL), cooled to −30° C., and MeMgBr (2.9 M in ether, 22 mmol) solution was slowly added dropwise to the reaction solution. The reaction mixture was slowly warmed to room temperature, stirred for 22 hours, and then the solvent was removed by vacuum under a nitrogen atmosphere. Hot hexane was then added and the filtrate was obtained through a filter filled with Celite 503. The solvent was removed from the obtained filtrate under a vacuum of nitrogen atmosphere. The obtained solid was dissolved in hexane (70 mL), filtered again with Celite 503, and the obtained filtrate was cooled to −30° C. to obtain the title compound 1 in a yellow solid form (yield of 78%).

$^1$H NMR ($C_6D_6$): δ 8.37 (m, 1H), 7.86 (m, 1H), 7.66 (m, 1H), 7.59 (m, 1H), 7.54-7.57 (m, 1H), 7.50 (m, 1H), 7.40 (m, 1H), 7.22 (m, 1H), 7.16 (m, 1H), 2.36 (s, 3H), 1.95 (s, 3H), 1.57 (s, 9H), 0.67 (s, 3H), 0.61 (s, 3H), 0.58 (s, 3H), −0.47 (s, 3H); $^{13}$C NMR ($CD_2Cl_2$): δ 164.46, 137.37, 136.17, 132.95, 131.89, 131.57, 130.53, 130.42, 129.58, 129.08, 128.77, 127.54, 126.93, 126.75, 124.99, 123.94, 111.67, 103.26, 59.88, 51.82, 35.25, 30.08, 21.23, 1.20, −0.45.

Example 2

Preparation of Transition Metal Catalyst 2 According to the Present Invention

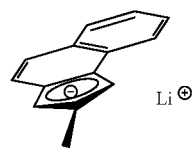

+

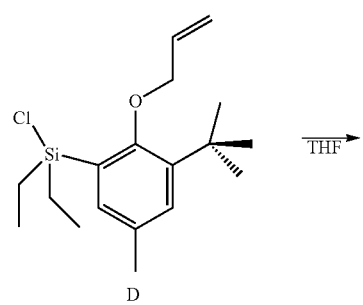

$\xrightarrow{\text{THF}}$

D

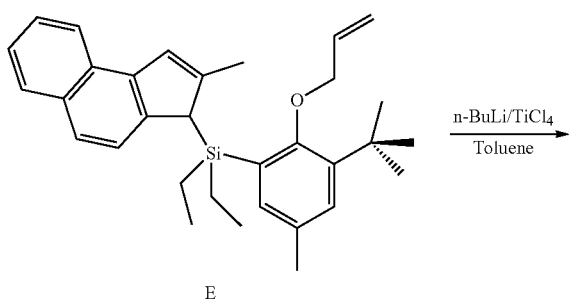

$\xrightarrow[\text{Toluene}]{\text{n-BuLi/TiCl}_4}$

E

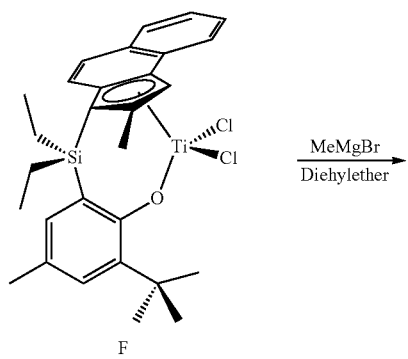

$\xrightarrow[\text{Diethylether}]{\text{MeMgBr}}$

F

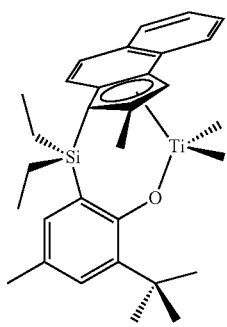

2

Preparation of [2-(allyloxy)-3-tert-butyl-5-methylphenyl](chloro)dimethylsilane (Compound D)

2-Allyloxy-1-bromo-3-tert-butyl-5-methylbenzene (19.8 g, 70 mmol) was dissolved in toluene (200 mL), then n-BuLi (36.4 ml, 2.5 M in hexane, 91 mmol) was slowly added at −78° C., and the reaction was stirred for 1 hour while raising the temperature to −20° C. The reaction mixture was cooled to −78° C. again and dichlorodiethylsilane (33 g, 210 mmol) was added rapidly. The reaction mixture was warmed to room temperature and then stirred for 5 hours. The resulting LiCl salt was filtered off and the solvent was removed in vacuo to obtain a yellow product (about 21.6 g, 95%), which proceeded without further purification for the next reaction.

$^1$H NMR (CDCl$_3$): δ 7.32 (m, 1H), 7.25 (m, 1H), 6.03 (m, 1H), 5.51 (m, 1H), 5.29 (m, 1H), 4.36 (m, 2H), 2.32 (s, 3H), 1.38 (s, 9H), 1.09-1.14 (m, 4H), 1.01-1.05 (m, 6H).

Preparation of [2-allyloxy-3-tertbutyl-5-fluorophenyl](diethyl)(2-methyl-3H-cyclopenta[a]naphthalen-3-yl)silane (Compound E)

2-Methyl-9bH-cyclopenta[a]naphthalene (5.42 g, 30.1 mmol) was added to THF (110 mL) and then n-BuLi (12.6 mL, 2.5 M in hexane, 31.6 mmol) was slowly added at −78□. After the addition of n-BuLi was completed, the mixture was stirred for 2 hours while slowly raising the temperature to room temperature. After the reaction mixture was cooled to −78□, a toluene (14 mL) solution of the 2-(allyloxy)-3-tert-butyl-5-methylphenyl](chloro)diethylsilane (Compound D, 10.75 g, 33.09 mmol) was slowly added dropwise, and then the temperature of the reaction mixture was slowly raised to room temperature. The reaction mixture was stirred at room temperature for an additional 3 hours, and distilled water (200 mL) was added to terminate the reaction. The organic layer was extracted with toluene (2×50 mL) and dried over Na$_2$SO$_4$. The solvent was removed in vacuo to obtain a yellow oily product, and the product was purified by flash chromatography (silica gel 40-63 μm, eluent: hexane-dichloromethane, 10:1, vol.) to obtain the title compound E (12.6 g, yield of 89%).

$^1$H NMR (CDCl$_3$): δ 8.13 (m, 1H), 7.90 (m, 1H), 7.44-7.56 (m, 3H), 7.36 (m, 1H), 7.30 (m, 1H), 7.16 (m, 1H), 7.02 (m, 1H), 6.12 (m, 1H), 5.63 (m, 1H), 5.34 (m, 1H), 4.51 (m, 2H), 4.35 (m, 1H), 2.31 (s, 3H), 2.10 (s, 3H), 1.50 (s, 9H), 0.84-0.95 (m, 6H), 0.64-0.70 (m, 4H).

Preparation of diethylsilylene(2-methylcyclopenta[a]naphthalen-3-yl)-2-tert-butyl-4-fluorophenoxy) dichloro titanium (Compound F)

Toluene (70 mL) in which Et$_3$N (4.6 g, 6.3 mL, 45 mmol) and the compound E (4.7 g, 10 mmol) were dissolved was cooled to −78° C. and n-BuLi (8.8 mL, 2.5 M in hexane, 22 mmol) was added slowly. The reaction mixture was warmed to room temperature and stirred for 20 hours. The reaction mixture was cooled to −78° C. again and a toluene solution (22 mL) of TiCl$_4$ (2.8 g, 1.65 mL, 15 mmol) was slowly added to the reaction mixture via a syringe. The reaction mixture was warmed slowly to room temperature, and stirred at 90° C. for 16 hours. The mixture was cooled to room temperature, and then the solvent was removed by vacuum. The reaction product was treated with hot hexane and the insoluble material was removed through a celite-pad filter. From the obtained filtrate, the solvent was appropriately removed by vacuum, and the product was recrystallized at −30° C. to obtain a reddish-brown product (the solid was melted when the temperature was raised to room temperature). NMR analysis showed that 2.6 g of the product, Compound F could be obtained at a yield of about 55 mol %. The following reaction was performed without further purification.

$^1$H NMR (CDCl$_3$): δ 8.31 (m, 1H), 7.76 (m, 1H), 7.70 (m, 1H), 7.61 (m, 1H), 7.59 (m, 1H), 7.44 (m, 1H), 7.29 (m, 1H), 7.18 (m, 2H), 2.50 (s, 3H), 2.41 (s, 3H), 1.25 (s, 9H), 1.03 (m, 6H), 0.85 (m, 4H).

Preparation of diethylsilylene(2-methylcyclopenta [a]naphthalen-3-yl)-2-tert-butyl-4-fluorophenoxy) dimethyl titanium (Compound 2)

The Compound F (5.5 g, 10 mmol, the reaction proceeded assuming that purity was 100%) was dissolved in diethylether (100 mL), and then MeMgBr (7.6 mL, 2.9 M in ether, 22 mmol) solution was slowly added at −30° C. The reaction mixture was stirred at room temperature for 22 hours, then the solvent was removed by vacuum, and the residue was treated with hot hexane to remove the insoluble material through the Celite-pad filter. The solvent was removed by vacuum and then treated with additional hot hexane (70 mL) to remove the insoluble material again through the celite-pad filter. After the hexane was removed, pentane (30 mL) was added, and a yellow solid was obtained through recrystallization at −30° C. The resulting yellow solid was washed with cold pentane, and recovered through a filter. The mother liquor was removed by vacuum, and then a second product was obtained through recrystallization by adding pentane (10 mL). The obtained yellow solid was dried under vacuum for 4 hours to obtain the title compound 2 (1.7 g).

$^1$H NMR (CD$_2$Cl$_2$): δ 8.37 (m, 1H), 7.86 (m, 1H), 7.66 (m, 1H), 7.59 (m, 1H), 7.56 (m, 1H), 7.50 (m, 1H), 7.40 (m, 1H), 7.21 (m, 1H), 7.10 (m, 1H), 2.35 (s, 3H), 1.92 (s, 3H), 1.55 (s, 9H), 1.01-1.19 (m, 10H), 0.65 (s, 3H), −0.48 (s, 3H); $^{13}$C NMR (CD$_2$Cl$_2$): δ 165.11, 137.60, 136.11, 133.64, 131.88, 131.11, 130.58, 130.18, 129.41, 129.03, 128.83, 127.97, 127.53, 126.90, 126.84, 125.07, 123.93, 112.06, 102.03, 59.64, 51.89, 35.19, 30.10, 21.26, 15.46, 7.83, 7.73, 6.08, 5.18.

Example 3

Preparation of Transition Metal Catalyst 3 According to the Present Invention

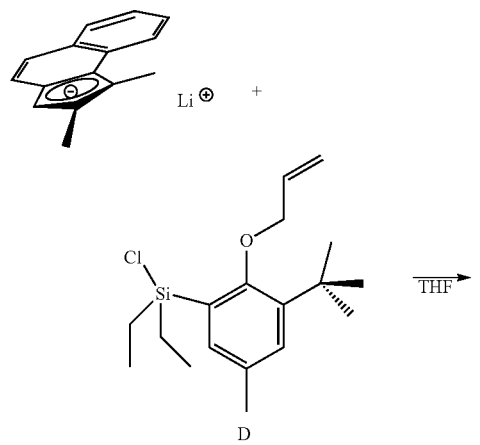

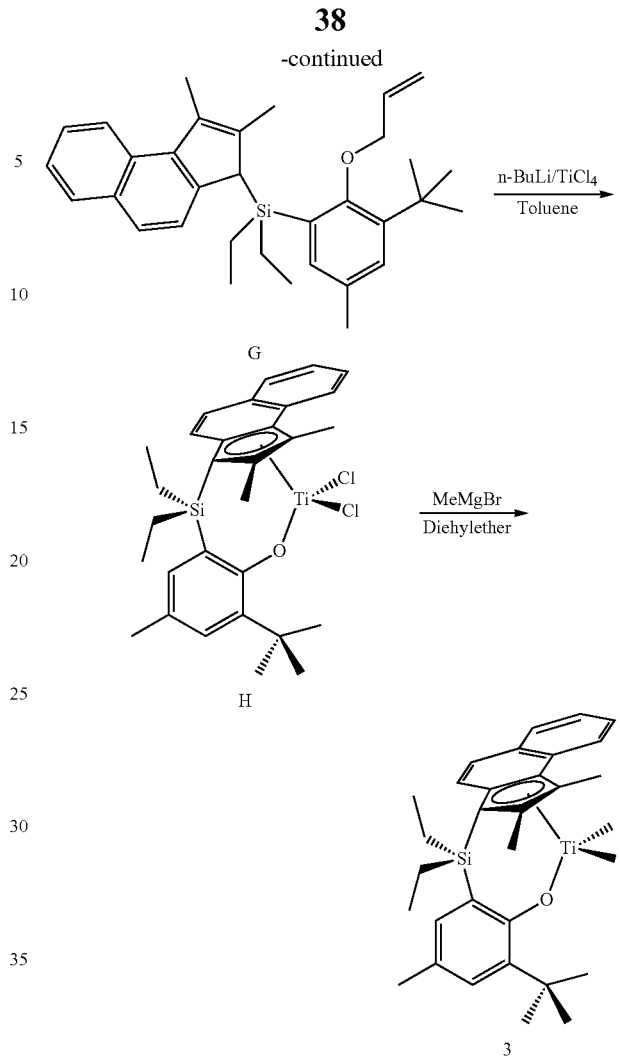

Preparation of (2-allyloxy-3-tert-butyl-5-methylphenyl)(1,2-dimethylcyclopenta[a]naphthalen-3-yl)diethylsilane (Compound G)

Compound G (yield: 78%, yellow oil) was obtained in the same manner as in the preparation of Compound E of Example 2 except that 1,2-dimethyl-9bH-cyclopenta[a] naphthalene (30.08 mmol) was used instead of 2-methyl-9bH-cyclopenta[a]naphthalene (30.08 mmol).

$^1$H NMR (CDCl$_3$): δ 8.57 (m, 1H), 7.87 (m, 1H), 7.36-7.49 (m, 3H), 7.28 (m, 1H), 7.22 (m, 1H), 6.84 (m, 1H), 6.06 (m, 1H), 5.56 (m, 1H), 5.30 (m, 1H), 4.41 (m, 2H), 4.16 (m, 1H), 2.50 (s, 3H), 2.21 (s, 3H), 1.98 (s, 3H), 1.44 (s, 9H), 0.88-0.96 (m, 2H), 0.79-0.85 (m, 3H), 0.63-0.72 (m, 5H).

Preparation of diethylsilylene(1,2-dimethylcyclopenta[a]naphthalen-3-yl)(3-tert-butyl-5-methyl-2-phenoxy) dichlorotitanium (Compound H)

Compound H (yield: 26%, reddish-brown solid) was obtained in the same manner as in the preparation of Compound F of Example 2 except that Compound G (10 mmol) was used instead of Compound E (10 mmol).

$^1$H NMR (CDCl$_3$): 8.64 (m, 1H), 7.78 (m, 1H), 7.70 (m, 1H), 7.60 (m, 1H), 7.41 (m, 1H), 7.33 (m, 1H), 7.19 (m, 1H), 3.01 (s, 3H), 2.41 (s, 3H), 2.39 (s, 3H), 1.18-1.31 (m, 2H), 1.24 (s, 9H), 1.03 (m, 6H), 0.84-0.90 (m, 2H).

Preparation of diethylsilylene(1,2-dimethylcyclopenta[a]naphthalen-3-yl)(3-tert-butyl-5-methyl-2-phenoxy) dimethyltitanium (Compound 3)

Compound 3 (yield: 93%, yellow solid) was obtained in the same manner as in the preparation of Compound 2 of Example 2 except that Compound H (10 mmol) was used instead of Compound F (10 mmol).

$^1$H NMR (CD$_2$Cl$_2$): δ 8.66 (m, 1H), 7.81 (m, 1H), 7.65 (m, 1H), 7.53 (m, 1H), 7.37 (m, 1H), 7.27 (m, 1H), 7.20 (m, 1H), 7.10 (m, 1H), 2.89 (s, 3H), 2.35 (s, 3H), 1.92 (s, 3H), 1.50 (s, 9H), 1.00-1.13 (m, 7H), 0.93 (m, 3H), 0.47 (s, 3H), −0.50 (s, 3H); $^{13}$CNMR (CD$_2$Cl$_2$): δ 165.18, 136.08, 135.98, 135.56, 132.60, 131.97, 130.96, 129.82, 129.33, 129.24, 128.41, 127.19, 126.73, 126.33, 124.69, 124.41, 123.75, 101.77, 58.54, 56.69, 35.13, 30.02, 21.25, 15.35, 13.37, 7.80, 6.10, 6.56.

Example 4

Preparation of Transition Metal Catalyst 4
According to the Present Invention

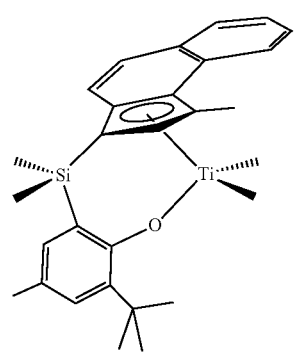

Dimethylsilylene(3-dimethylcyclopenta[a]naphthalene-3-yl)(3-tert-butyl-5-methyl-2-phenoxy)dimethyltitanium (Compound 4) was prepared by the method of Example 1 (yield: 93%, yellow solid).

$^1$H NMR (CD$_2$Cl$_2$): δ 8.63 (m, 1H), 7.73 (m, 1H), 7.68 (m, 1H), 7.52 (m, 1H), 7.19 (s, 1H), 7.15 (d, 1H), 6.82 (d, 1H), 6.52 (s, 1H), 3.14 (s, 3H), 2.36 (s, 3H), 1.45 (s, 9H), 0.69 (s, 3H), 0.62 (s, 3H), 0.37 (s, 3H), −0.49 (s, 3H).

Example 5

Preparation of Transition Metal Catalyst 5
According to the Present Invention

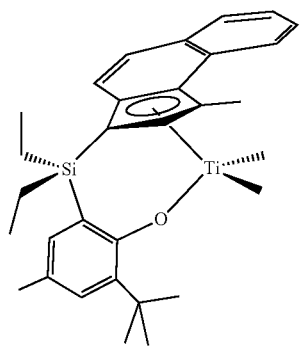

Diethylsilylene(3-dimethylcyclopenta[a]naphthalene-3-yl)(3-tert-butyl-5-methyl-2-phenoxy)dimethyltitanium (Compound 5) was prepared by the method of Example 1 (yield 93%, yellow solid).

$^1$H NMR (CD$_2$Cl$_2$): δ 8.63 (d, 1H), 7.74 (d, 1H), 7.68 (m, 1H), 7.52 (m, 1H), 7.21 (s, 1H), 7.15 (d, 2H), 6.82 (s, 1H), 6.53 (s, 1H), 3.15 (s, 3H), 2.37 (s, 3H), 1.46 (s, 9H), 1.17 (m, 4H), 1.04 (m, 6H) 0.7 (s, 3H), −0.49 (s, 3H).

Comparative Example 1

Preparation of dimethylsilylene(2-methylinden-1-yl)(3-tert-butyl-5-methyl-2-phenoxy)dimethyltitanium

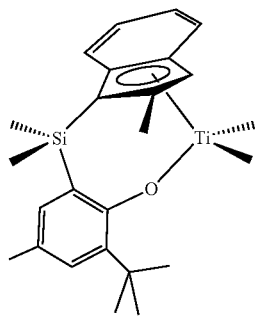

Dimethylsilylene(2-methylinden-1-yl)(3-tert-butyl-5-methyl-2-phenoxy)dimethyltitanium was prepared in the same manner as in Example 1 (yield: 73%, yellow solid).

$^1$H NMR (C$_6$D$_6$): δ 7.60 (m, 1H), 7.47 (m, 1H), 7.27 (m, 1H), 7.18 (m, 1H), 7.06 (m, 1H), 6.98 (m, 1H), 6.64, (m, 1H), 2.27 (s, 3H), 1.70 (s, 9H), 1.63 (s, 3H), 0.95 (s, 3H), 0.48 (s, 3H), 0.41 (s, 3H), 0.13 (s, 3H); $^{13}$CNMR (CD$_2$Cl$_2$): δ 164.51, 136.11, 135.35, 132.57, 133.21, 131.56, 129.59, 129.03, 128.77, 127.33, 126.43, 125.01, 124.88, 110.56, 102.14, 58.41, 52.19, 35.25, 30.07, 21.18, 1.10, −0.42.

Comparative Example 2

Preparation of dimethylsilylene(2,4,5-trimethyl-6H-cyclopenta[2,3-b]thiophen-6-yl)(3-tert-butyl-5-methyl-2-phenoxy)dimethyltitanium)

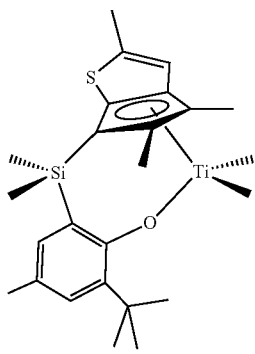

Dimethylsilylene(2,4,5-trimethyl-6H-cyclopenta[2,3-b]thiophen-6-yl)(3-tert-butyl-5-methyl-2-phenoxy)dimethyltitanium was prepared in the same manner as in Example 1 (yield: 81%, yellow solid).

$^1$H NMR (CD$_2$Cl$_2$): δ 7.18 (m, 1H), 7.07 (m, 1H), 6.89 (m, 1H), 2.56 (s, 3H), 2.36 (s, 3H), 2.31 (s, 3H), 1.61 (s, 3H), 1.58 (s, 9H), 0.51 (s, 3H), 0.43 (s, 3H), 0.35 (s, 3H), 0.02 (s, 3H); $^{13}$C NMR (CD$_2$Cl$_2$): δ 164.54, 148.69, 142.46, 136.12, 135.55, 134.54, 133.14, 131.14, 129.59, 129.51, 118.09, 116.24, 99.60, 57.41, 55.19, 35.25, 30.06, 21.14, 16.88, 12.72, −0.35, −1.42.

Comparative Example 3

Preparation of dimethylsilylene(2,3,4,5-tetramethyl-cyclopentadienyl)(3-tert-butyl-5-methyl-2-phenoxy)dimethyltitanium

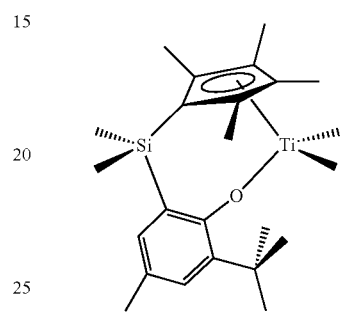

Dimethylsilylene(2,3,4,5-tetramethylcyclopentadienyl)(3-tert-butyl-5-methyl-2-phenoxy)dimethyltitanium was prepared in the same manner as in Example 1.

$^1$H NMR (CDCl$_3$): δ 7.21 (m, 1H, Ar—H), 7.17 (m, 1H, Ar—H), 2.31 (s, 3H, Ar-Me), 2.02 (s, 6H, C$_5$Me$_4$), 1.95 (s, 6H, C$_5$Me$_4$), 1.36 (s, 9H, Ar-tBu), 0.62 (s, 3H, Si-Me), 0.58 (s, 3H, Si-Me), 0.21 (s, 3H), 0.07 (s, 3H).

Comparative Example 4

Preparation of dimethylsilylene(tetramethylcyclopentadienyl)-N-tertbutyldimethyltitanium

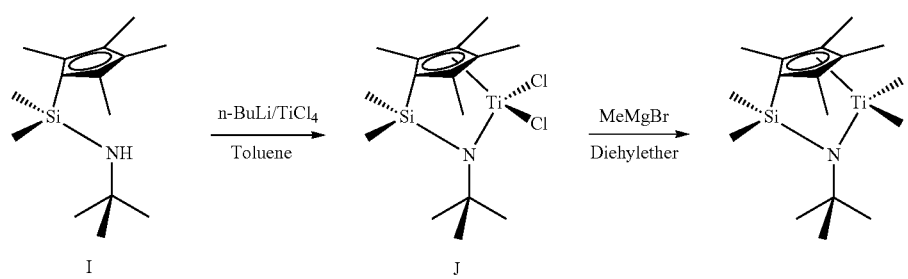

Toluene (70 mL) in which Compound I (20 mmol) and Et₃N (45 mmol) were dissolved was cooled to −78° C. and n-BuLi (2.5 M in hexane, 22 mmol) was slowly added thereto. After the addition of n-BuLi was completed, the reaction mixture was raised to room temperature and stirred for 20 hours. After the reaction mixture was cooled again to −78° C., a solution of TiCl₄ (15 mmol) in toluene (22 mL) was slowly added dropwise. The reaction solution was warmed to room temperature and stirred for 16 hours. The reaction solution was dried at room temperature under vacuum, and the resulting reaction product was treated with hexane to obtain a filtrate through a filter filled with Celite 503. The obtained filtrate was dried by vacuum and dissolved in hexane solvent, and then cooled to −30° C. to obtain a reddish-brown solid compound J in a yield of 58%. The Compound J was dissolved in diethyl ether (100 mL), cooled to −30° C., and MeMgBr (2.9 M in ether, 22 mmol) solution was slowly added dropwise to the reaction solution. The reaction mixture was warmed to room temperature, stirred for 22 hours, and vacuum dried. The obtained reaction product was treated with pentane to obtain a filtrate through a filter filled with Celite 503. The obtained filtrate was dried by vacuum, and the product was dissolved in pentane (70 mL). Then, the product was filtered through Celite 503, and the obtained filtrate was cooled to −30° C. to obtain dimethylsilylene(tetramethylcyclopentadienyl)-N-tertbutyldimethyltitanium in the form of a yellow solid in a yield of 78%.

$^1$H NMR (CDCl₃): δ 2.15 (s, 6H, C₅Me₄), 1.902 (s, 6H, C₅Me₄), 1.553 (s, 9H, Me₃CN), 0.464 (s, 6H, Me₂Si), 0.159 (s, 6H, Me₂Si)

Examples 6 to 15 and Comparative Examples 5 to 8

Copolymerization of Ethylene and 1-Hexene

The ethylene/1-hexene copolymerization process was performed as follows:

The polymerization was performed in a temperature-controllable reactor used in high pressure, equipped with a mechanical stirrer. TiBA/BHT (triisobutylaluminum/2,6-di-tert-butyl-4-methylphenol at a molar ratio of 1:1, 30 μmol, 120 μL, 0.25 M toluene solution) as a scavenger, 1-hexene (270 μL, 300 μL, or 450 μL) and toluene were added to this reactor to make a total volume of 5 mL. The temperature of the reactor was adjusted to the polymerization temperature (130° C. or 150° C.), and then a stirring rate was set to 800 rpm. The ethylene was added at 220 psi at 150° C., and at 180 psi at 130° C. to keep the ethylene constant depending on the polymerization temperature. An amount of the polymerization catalyst used was 10 nmole or 15 nmole, and an amount of the cocatalyst relative to the polymerization catalyst was fixed to 5 equivalents. The polymerization catalyst was added to the reactor, and then polymerization was started while adding 5 equivalents of the cocatalyst triphenylmethylium tetrakis(pentafluorophenyl)borate (TTB). The polymerization reaction was performed for 5 minutes, or the polymerization was terminated at the time the polymer to be prepared did not exceed 100 to 200 mg.

After the polymerization was completed, the reactor temperature was cooled to room temperature, and ethylene in the reactor was slowly removed by evacuation. The prepared polymer was then dried by vacuum.

Polymerization reaction conditions of Examples and Comparative Examples and physical properties of the obtained polymers are shown in Table 1 below.

TABLE 1

Ethylene/1-hexene copolymerization conditions and results

| Polymerization Example | | Polymerization catalyst | Polymerization temperature T (° C.) | Ethylene pressure pE (psi) | Amount of 1-hexene used [1-C6] (μL) | Amount of polymerization catalyst used, Cat. (nmol) | Reaction time t (sec) | Yield of polymer (mg) | Catalytic activity (Kg mmol⁻¹ hr⁻¹) | GPC Mw, (× 10³) | PDI | $^{13}$C NMR x (1-hexene) (mol %) |
|---|---|---|---|---|---|---|---|---|---|---|---|---|
| Example | 6 | Example 1 | 110 | 150 | 205 | 10 | 113 | 83 | 264.4 | 107 | 2.3 | 14.9 |
| | 7 | | 150 | 200 | 230 | 15 | 301 | 39 | 46.6 | 97 | 2.2 | 10.6 |
| | 8 | Example 2 | 110 | 150 | 150 | 10 | 61 | 145 | 855.7 | 153 | 2.5 | 15 |
| | 9 | | 150 | 200 | | | 97 | 52 | 192.9 | 137 | 2.2 | 8.0 |
| | 10 | Example 3 | 110 | 150 | 200 | 10 | 63 | 225 | 1285.7 | 71 | 3.7 | |
| | 11 | | 150 | 200 | | | 301 | 43 | 51.4 | 121 | 2.2 | 7.9 |
| | 12 | Example 4 | 110 | 150 | 120 | 5 | 16 | 124 | 5,580 | 37 | 2.0 | |
| | 13 | | 150 | 200 | 180 | 20 | 61 | 74 | 218.3 | 32 | 2.1 | 11.7 |
| | 14 | Example 5 | 110 | 150 | 120 | 5 | 16 | 105 | 4,725 | 45 | 2.2 | |
| | 15 | | 150 | 200 | 180 | 10 | 32 | 103 | 1,158.7 | 34 | 2.2 | |
| Comparative Example | 5 | Comparative Example 1 | 110 | 150 | 200 | 10 | 61 | 164 | 967.8 | 116 | 2.4 | 16.8 |
| | 6 | | 150 | 200 | | | 304 | 27 | 31.9 | 142 | 2.1 | 7.8 |
| | 7 | Comparative Example 2 | 110 | 150 | 200 | 10 | 171 | 52 | 109.5 | 140 | 2.2 | 6.1 |
| | 8 | | 150 | 200 | | | 303 | 25 | 29.7 | 146 | 2.3 | 4.3 |

TIBA/BHT (1:1), nAl = 30 mol, [TTB]/[Cat] = 5.

As shown in Table 1, it could be appreciated that the activities of the ethylene/1-hexene copolymerization of Examples 8 to 15 were higher than those of Comparative Examples 5 to 8. In particular, it could be confirmed that the activities of Examples 7, 9, 11, 13 and 15 at the polymerization temperature of 150° C. were maintained to be higher than those of Comparative Examples 6 and 8. It could be appreciated in view of the copolymerization characteristic which is reactivity with respect to 1-hexene that the catalysts of the Examples had a comparatively high level of copolymerization reactivity as compared to the results of the Comparative Examples. It could be confirmed that the catalysts of the Examples maintained high copolymerization characteristics at a polymerization temperature of 150° C., a relatively high temperature. In particular, it could be confirmed in Examples 9, 11, 13 and 15 that even though the polymerization was performed at a concentration of 1-hexene of 150 μL, the content of 1-hexene in the copolymer was higher than those of Comparative Examples 6 and 8, and it could be appreciated that Examples 9, 11, 13 and 15 had the highest copolymerization characteristic among the catalysts of Examples. It could be confirmed that in the molecular weight of the resulting copolymers, the catalysts of Examples had the molecular weight equivalent to the molecular weight of the copolymers polymerized from the Example at a high temperature of 150° C. despite having a relatively high level of copolymerization characteristic.

As described above, it could be confirmed that the catalysts of the Examples had a high level of copolymerization characteristic and polymerization activity as compared to the catalysts of the Comparative Examples at the high temperature copolymerization conditions, and it could be confirmed that the molecular weight of the resulting copolymer was the same as the molecular weight of the copolymer prepared from the catalysts of the Comparative Examples.

Examples 16 to 28 and Comparative Examples 9 to 14

Copolymerization of Ethylene and 1-Octene

The ethylene/1-octene copolymerization process was performed as follows:

The polymerization was performed in a temperature-controllable continuous polymerization reactor equipped with a mechanical stirrer.

A methylene cyclohexane solvent, 1-octene, and the ethylene monomer were fed at a pressure of 40 bar to a 1.0 L continuously stirred reactor preheated at a temperature of 130 to 200° C. The copolymerization reaction was performed by feeding the polymerization catalyst and the cocatalyst of AnB (N,N-dimethylanilinium tetrakis(pentafluorophenyl)borate) or TTB (triphenylmethylium tetrakis(pentafluorophenyl)borate) from a catalyst storage tank to the reactor. The reaction solvent, methylcyclohexane, was fed into the reactor in an amount of 5 kg per hour, the residence time of the reactor was adjusted to about 8 minutes, and the ethylene was fed into the reactor while regulating an amount thereof according to C2/MCH ratios of 8, 10 and 12 within a range of about 400 to 600 g per hour. The polymerization was performed at a relatively high temperature of 130 to 200° C. An amount of the fed catalyst was fed to the reactor while regulating the amount so that the temperature difference between the feed temperature and the reactor temperature was maintained. The polymer solution formed by the copolymerization reaction was decompressed to 3 bar at the rear end of the reactor and then sent to a solvent separator to remove most of the solvent by a solvent separation process.

The polymerization results obtained by proceeding as described above are summarized in Table 2 below.

TABLE 2

Results of ethylene/1-octene copolymerization using continuous polymerization reactor

| Polymerization Example | | Catalyst | Feed temperature (° C.) | Reactor temperature (° C.) | C2 (%) | C8/C2 | Cocatalyst | Amount of fed catalyst (μmol/kg-polymer) | Density | MI | PDI |
|---|---|---|---|---|---|---|---|---|---|---|---|
| Example | 16 | Example 1 | 45 | 140 | 8 | 0.85 | TTB | 3.4 | 0.867 | 13.49 | 3.0 |
| | 17 | | 45 | 140 | 8 | 0.7 | AnB | 3.3 | 0.873 | 4.0 | 2.8 |
| | 18 | | 55 | 150 | 8 | 0.8 | TTB | 3.6 | 0.865 | 21.902 | 2.1 |
| | 19 | | 55 | 150 | 8 | 0.7 | AnB | 3.3 | 0.871 | 19.97 | 3.0 |
| | 20 | Example 2 | 45 | 140 | 8 | 0.7 | TTB | 2.9 | 0.873 | 0.95 | 3.0 |
| | 21 | | 45 | 140 | 8 | 0.7 | AnB | 2.5 | 0.872 | 1.042 | 3.0 |
| | 22 | | 55 | 150 | 8 | 0.7 | TTB | 6.0 | 0.872 | 3.5 | 2.9 |
| | 23 | | 55 | 150 | 8 | 0.7 | AnB | 6.5 | 0.872 | 3.2 | 2.9 |
| | 24 | | 30 | 150 | 10 | 0.6 | AnB | 3.6 | 0.872 | 0.97 | 2.7 |
| | 25 | | 30 | 150 | 12 | 0.8 | AnB | 1.4 | 0.875 | 0.76 | 2.6 |
| | 26 | | 40 | 160 | 12 | 0.8 | AnB | 1.75 | 0.874 | 1.2 | 2.4 |
| | 27 | | 65 | 180 | 12 | 0.16 | TTB | 4.0 | 0.901 | 0.05 | 3.4 |
| | 28 | | 86 | 200 | 12 | 0.16 | TTB | 10 | 0.915 | 0.2 | 3.8 |
| Comparative Example | 9 | Comparative Example 3 | 45 | 140 | 8 | 0.7 | TTB | 6.5 | 0.885 | 70 | 2.4 |
| | 10 | | 30 | 150 | 8 | 0.7 | TTB | 7.4 | 0.886 | 60 | 2.8 |
| | 11 | Comparative Example 4 | 45 | 140 | 8 | 0.7 | TTB | 6.8 | 0.885 | 70 | 3.1 |
| | 12 | | 45 | 140 | 10 | 0.8 | TTB | 8.0 | 0.882 | 80 | 2.4 |
| | 13 | | 30 | 150 | 8 | 0.7 | TTB | 5.7 | 0.884 | 70 | 2.4 |
| | 14 | | 60 | 160 | 10 | 0.6 | TTB | 5.4 | 0.901 | 5.21 | 2.3 |

As shown in Table 2 above, it could be appreciated that the ethylene/1-octene copolymerization activity when the transition metal compound of the present invention was used as the polymerization catalyst was higher than that of the ethylene/1-octene copolymerization activity using the known catalyst by confirming that the fed amount of the catalyst was small under the same polymerization temperature condition (Examples 16 and 20 vs Comparative Examples 9 and 12). In particular, it could be confirmed that the activities of Examples 18, 19, 22, and 23 at the polymerization temperature of 150° C. were maintained to be higher than those of Comparative Examples 10 and 13. In view of the copolymerization characteristic which is a reactivity with respect to 1-octene, the catalysts of the Examples could prepare low density copolymers even at a low C8/C2 ratio, from which it could be appreciated that the catalysts of the Examples had a relatively high level of copolymerization reactivity as compared to the results of the Comparative Examples. It could be confirmed that the catalysts of the Examples maintained a high copolymerization characteristic at a polymerization temperature of 150° C., which is considered as a high polymerization temperature in the preparation of low density polyethylene. In particular, it could be confirmed in Examples 24 to 26 that low density polyethylene having a high molecular weight of 0.87 g/ml could be prepared under the condition of low C8/C2 ratio even at high polymerization temperatures of 150° C. and 160° C. Unlike Comparative Example 14, it could be confirmed that in Examples 27 and 28, the copolymer having a high molecular weight in a linear low density region of a density of 0.901 or 0.915 g/ml could be prepared at very high polymerization temperatures of 180° C. and 200° C. As shown in Table 2, it could be confirmed that the catalysts of Examples had high copolymerization characteristics at a high polymerization temperature of 140° C. or higher as compared to the catalysts of Comparative Examples, and could prepare low density to medium density polyethylene having a high level of molecular weight.

Although the Examples of the present invention have been disclosed in more details as described above, those skilled in the art will appreciate that various modifications of the present invention can be made without departing from the scope of the present invention defined in the accompanying claims. Therefore, further modifications in Examples of the present invention will not deviate from the technology of the present invention.

INDUSTRIAL APPLICABILITY

The transition metal compound or the catalyst composition comprising the transition metal compound according to the present invention may have a simple synthesis process to be capable of being easily prepared with high yield by an economical method, and further, may provide a high thermal stability of the catalyst to be capable of maintaining high catalytic activity at a high temperature, having good copolymerization reactivity with other olefins, and preparing the high molecular weight polymer having a desired density with high yield by adjusting a polymerization temperature, and thus the commercial utility is higher than those of previously known metallocene and non-metallocene single active site catalysts. Therefore, the transition metal according to the present invention and the catalyst composition including the same may be effectively used for the preparation of the ethylene homopolymer or the copolymer of ethylene and α-olefin having various physical properties.

The invention claimed is:

1. A transition metal compound represented by Chemical Formula 1:

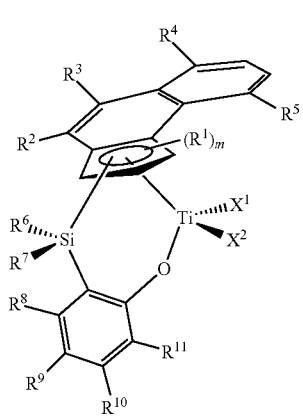

[Chemical Formula 1]

wherein,
M is a transition metal of Group 4 in the periodic table;
$R^1$ to $R^5$ are each independently hydrogen, (C1-C20)alkyl, (C6-C20)aryl, (C3-C20)cycloalkyl, halogen, (C2-C20)alkenyl, (C3-C20)heteroaryl, (C3-C20)heterocycloalkyl, —$OR^{a1}$, —$SR^{a2}$, —$NR^{a3}R^{a4}$ or —$PR^{a5}R^{a6}$, or $R^2$ and $R^4$ are optionally linked to an adjacent substituent via (C2-C7)alkylene or (C3-C7)alkenylene to form a fused ring;

m is an integer of 1 or 2, and when m is an integer of 2, $R^1$ are the same as each other or different from each other;

$R^6$ and $R^7$ are each independently hydrogen, (C1-C20)alkyl, halo(C1-C20)alkyl, (C3-C20)cycloalkyl, (C6-C20)aryl, (C1-C20)alkyl(C6-C20)aryl, (C6-C20)aryl(C1-C20)alkyl, (C3-C20)heteroaryl, —$OR^{a1}$, —$SR^{a2}$, —$NR^{a3}R^{a4}$ or —$PR^{a5}R^{a6}$, or $R^6$ and $R^7$ are optionally linked via (C4-C7)alkylene to form a ring;

$R^8$ to $R^{10}$ are each independently hydrogen, (C1-C20)alkyl, halo(C1-C20)alkyl, halogen, (C6-C20)aryl, (C3-C20)cycloalkyl, halogen, (C2-C20)alkenyl, (C3-C20)heteroaryl, (C1-C20)heterocycloalkyl, —$OR^{a1}$, —$SR^{a2}$, —$NR^{a3}R^{a4}$ or —$PR^{a5}R^{a6}$, or $R^8$ to $R^{10}$ are optionally linked to an adjacent substituent via (C4-C7)alkenylene with without an aromatic ring to form a fused ring;

$R^{11}$ is (C1-C20)alkyl or is optionally linked to $R^{10}$ via (C4-C7)alkenylene with or without an aromatic ring to form a fused ring, and the alkyl of $R^{11}$ is optionally further substituted with at least one selected from the group consisting of halogen, (C1-C20)alkyl, halo (C1-C20)alkyl, (C6-C12)aryl, (C1-C10)alkyl(C6-C12)aryl, (C6-C12)aryl(C1-C10)alkyl, —$OR^{a1}$, —$SR^{a2}$, —$NR^{a3}R^{a4}$, and —$PR^{a5}R^{a6}$;

$R^{a1}$ to $R^{a6}$ are each independently (C1-C20)alkyl or (C6-C20)aryl;

the alkyl, aryl, cycloalkyl, heteroaryl or heterocycloalkyl of $R^1$ to $R^5$ and $R^8$ to $R^{10}$ and the alkyl or aryl of $R^{a1}$ to $R^{a6}$ are optionally further substituted with at least one selected from the group consisting of halogen, (C1-C20)alkyl, halo(C1-C20)alkyl, (C1-C20)alkoxy, (C6-C20)aryl, (C6-C20)aryloxy, nitro, cyano, —$OSiR^{b1}R^{b2}R^{b3}$, —$SR^{b4}$, —$NR^{b5}R^{b6}$, and —$PR^{b7}R^{b8}$;

$R^{b1}$ to $R^{b8}$ are each independently (C1-C20)alkyl, (C6-C20)aryl, (C6-C20)ar(C1-C20)alkyl, (C1-C20)alkyl (C6-C20)aryl or (C3-C20)cycloalkyl;

$X^1$ and $X^2$ are each independently halogen, (C1-C20)alkyl, (C3-C20)cycloalkyl, (C6-C20)aryl, (C6-C20)aryl(C1-C20)alkyl, ((C1-C20)alkyl(C6-C20)aryl) (C1-C20)alkyl, (C1-C20)alkoxy, (C6-C20)aryloxy, (C1-C20)alkyl(C6-C20)aryloxy, (C1-C20)alkoxy (C6-C20)aryloxy, —$OSiR^aR^bR^c$, —$SR^d$, —$NR^eR^f$, —$PR^gR^h$ or (C1-C20)alkylidene;

$R^a$ to $R^d$ are each independently (C1-C20)alkyl, (C6-C20)aryl, (C6-C20)ar(C1-C20)alkyl, (C1-C20)alkyl (C6-C20)aryl or (C3-C20)cycloalkyl;

$R^e$ to $R^h$ are each independently (C1-C20)alkyl, (C6-C20)aryl, (C6-C20)ar(C1-C20)alkyl, (C1-C20)alkyl (C6-C20)aryl, (C3-C20)cycloalkyl, tri(C1-C20)alkylsilyl or tri(C6-C20)arylsilyl;

with the proviso that when one of $X^1$ and $X^2$ is (C1-C20)alkylidene, the other one is absent; and the heteroaryl and heterocycloalkyl include at least one heteroatom selected from N, O and S.

2. The transition metal compound of claim 1, wherein the transition metal compound is selected from Chemical Formulas 2, 3 or 4:

[Chemical Formula 2]

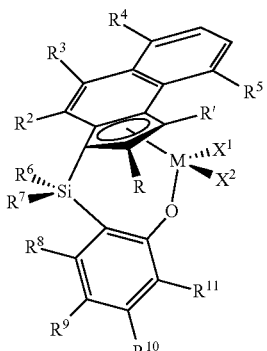

[Chemical Formula 3]

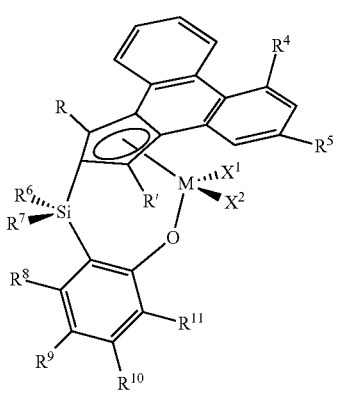

[Chemical Formula 4]

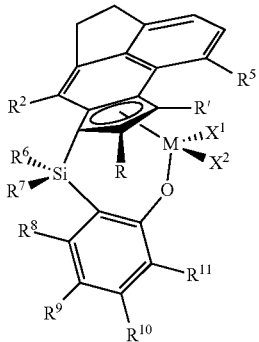

wherein in Chemical Formulas 2 to 4,

R, R', $R^2$, $R^3$, $R^4$ and $R^5$ are each independently hydrogen, (C1-C20)alkyl, (C6-C20)aryl, (C3-C20)cycloalkyl, halogen, (C2-C20)alkenyl, (C3-C20)heteroaryl, (C3-C20)heterocycloalkyl, —$OR^{a1}$, —$SR^{a2}$, —$NR^{a3}R^{a4}$ or —$PR^{a5}R^{a6}$;

$R^{a1}$ to $R^{a6}$ are each independently (C1-C20)alkyl or (C6-C20)aryl;

the alkyl, aryl, cycloalkyl, heteroaryl or heterocycloalkyl of R, R', $R^2$, $R^3$, $R^4$ and $R^5$ and the alkyl or aryl of $R^{a1}$ to $R^{a6}$ are optionally further substituted with at least one selected from the group consisting of halogen, (C1-C20)alkyl, halo(C1-C20)alkyl, (C1-C20)alkoxy, (C6-C20)aryl, (C6-C20)aryloxy, nitro, cyano, —$OSiR^{b1}R^{b2}R^{b3}$, —$SR^{b4}$, —$NR^{b5}R^{b6}$, and —$PR^{b7}R^{b8}$; and $R^{b1}$ to $R^{b8}$ are each independently (C1-C20)alkyl, (C6-C20)aryl, (C6-C20)ar(C1-C20)alkyl, (C1-C20)alkyl(C6-C20)aryl or (C3-C20)cycloalkyl.

3. The transition metal compound of claim 2, wherein $R^{11}$ is (C1-C20)alkyl, and the alkyl of $R^{11}$ is optionally further substituted with at least one selected from the group consisting of halogen, (C1-C20)alkyl, halo(C1-C20)alkyl, (C6-C12)aryl, (C1-C10)alkyl(C6-C12)aryl, (C6-C12)aryl(C1-C10)alkyl, (C1-C10)alkoxy, (C6-C12)aryloxy, (C1-C10)alkylthio, (C6-C12)arylthio, di(C1-C10)alkylamino, di(C6-C12)arylamino, di(C1-C10)alkylphosphine and di(C6-C12)arylphosphine.

4. The transition metal compound of claim 3, wherein the transition metal compound is selected from Chemical Formulas 5, 6 or 7:

[Chemical Formula 5]

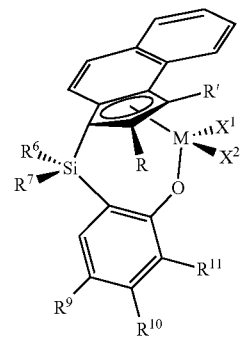

[Chemical Formula 6]

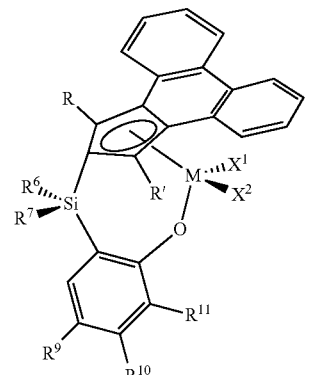

[Chemical Formula 7]

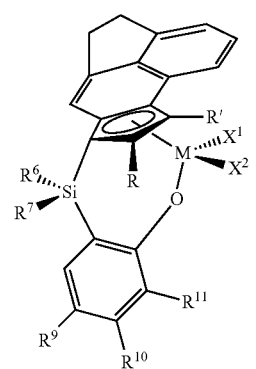

wherein

R and R' are each independently hydrogen, (C1-C20)alkyl or halo(C1-C20)alkyl;

$R^6$ and $R^7$ are each independently (C1-C20)alkyl, halo(C1-C20)alkyl, (C6-C20)aryl or (C6-C20)aryl(C1-C20)alkyl;

$R^9$ and $R^{10}$ are each independently hydrogen, (C1-C20)alkyl, halo(C1-C20)alkyl or halogen, or $R^9$ and $R^{10}$ are optionally linked via

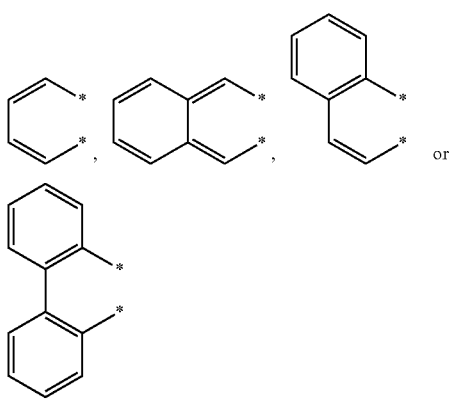
to form a fused ring; and
$R^{11}$ is (C1-C20)alkyl.
5. The transition metal compound of claim 4, wherein the transition metal compound is selected from the following compounds:
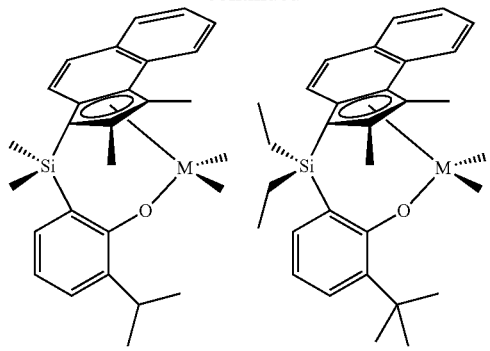
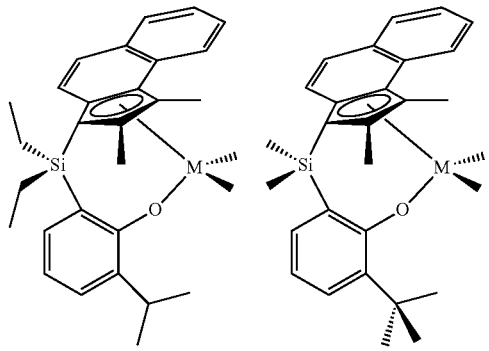
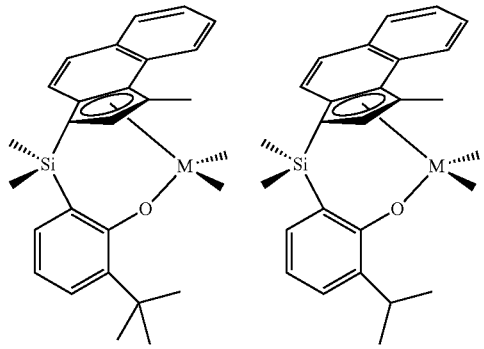
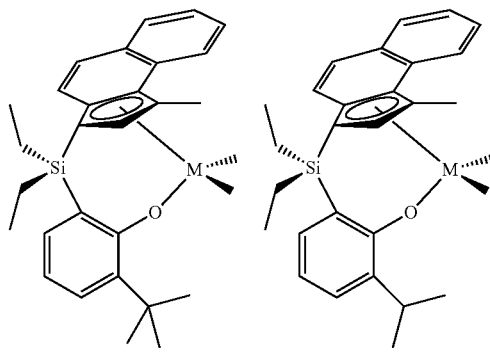

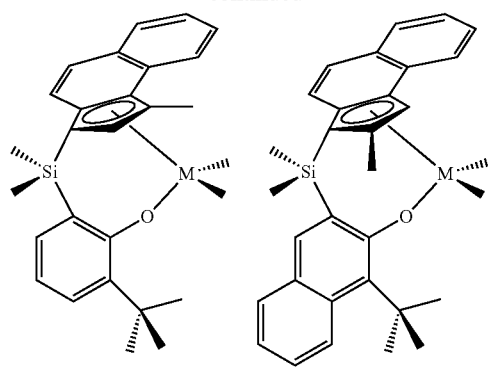
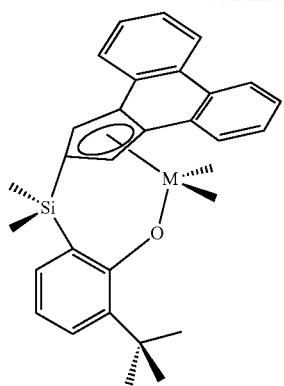
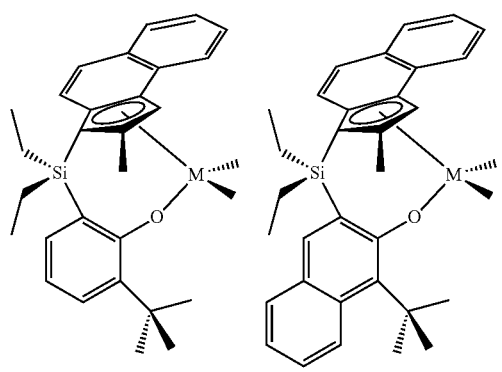
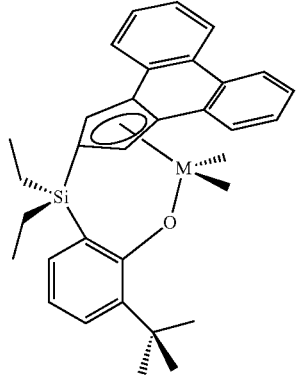
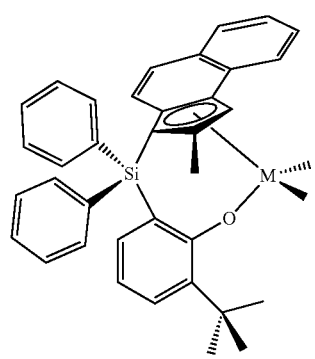
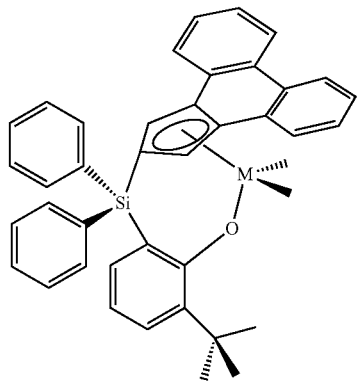
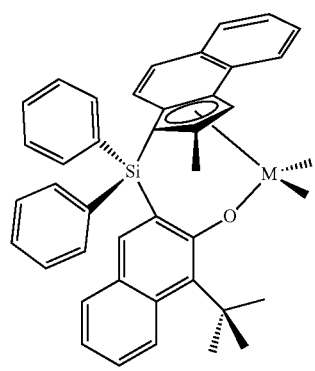
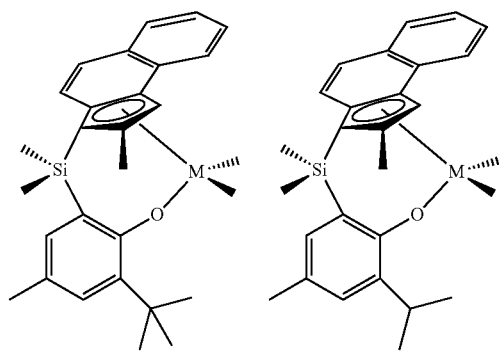

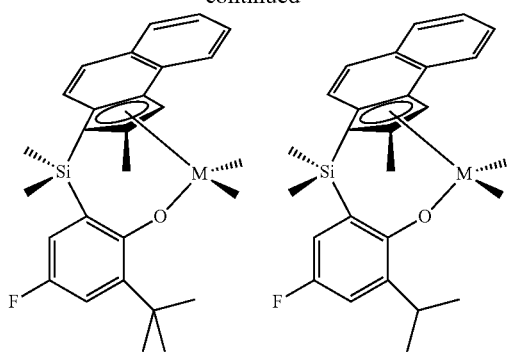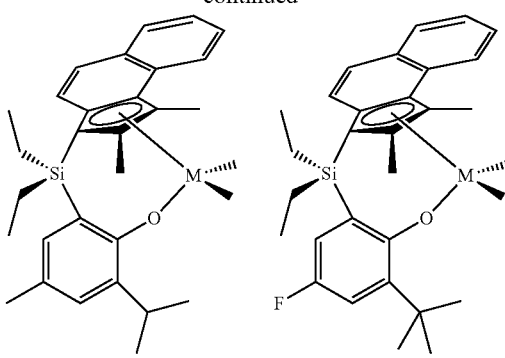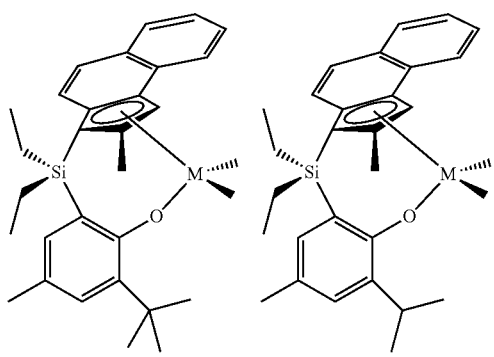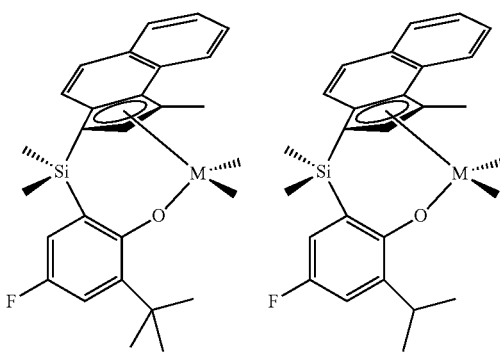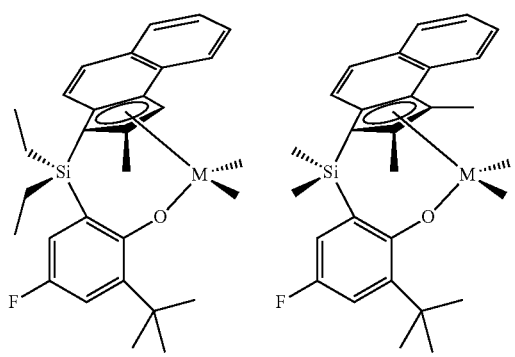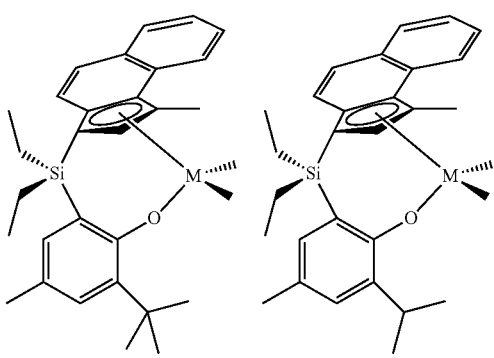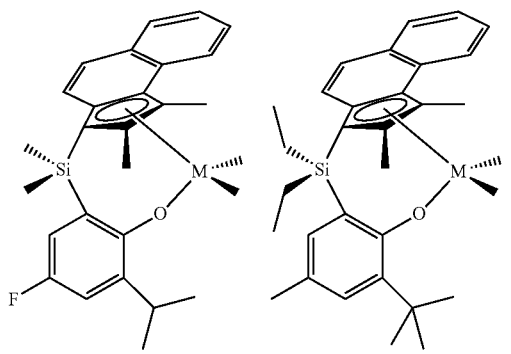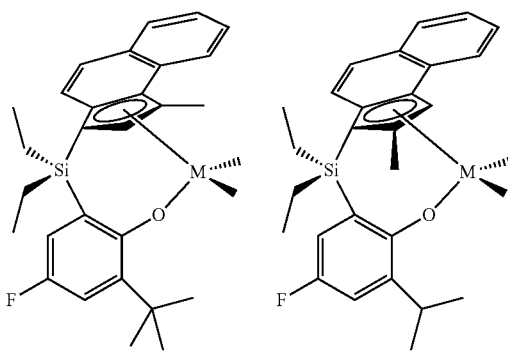

-continued
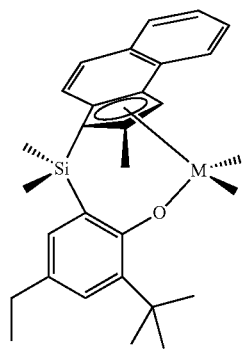
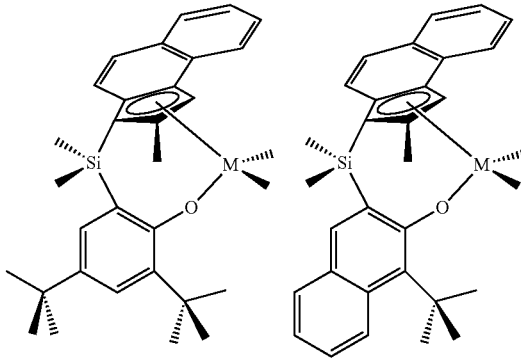
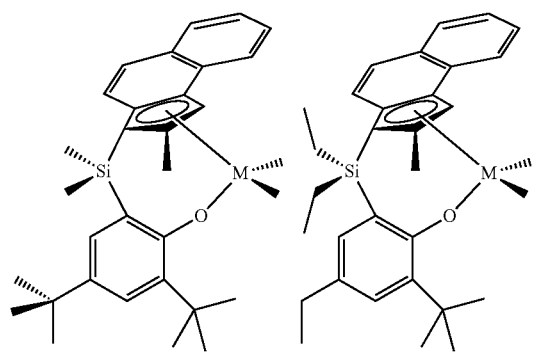
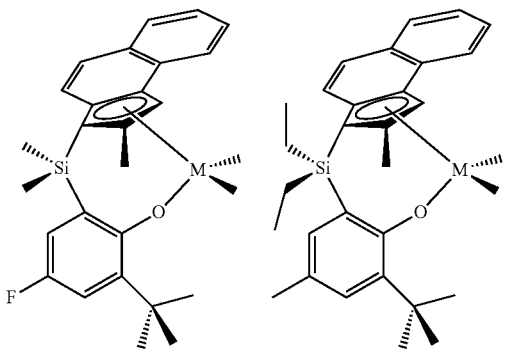
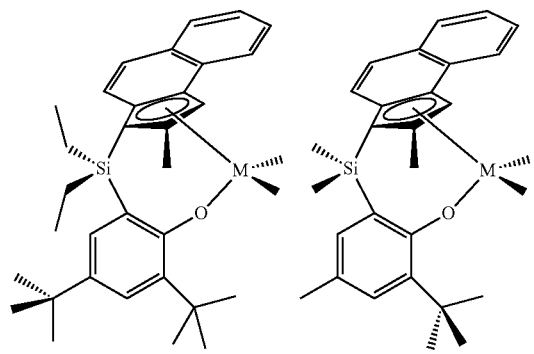
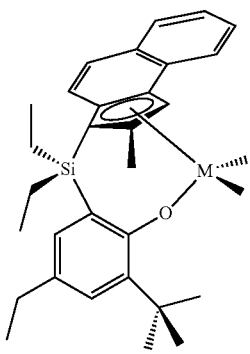
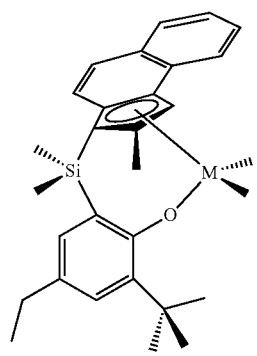
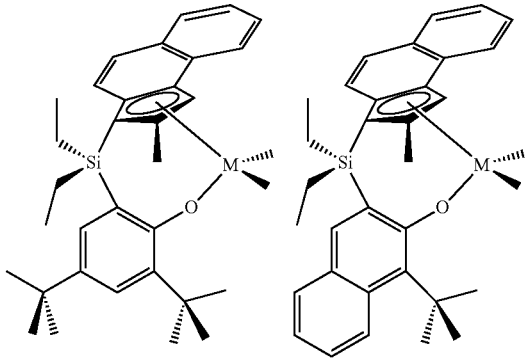

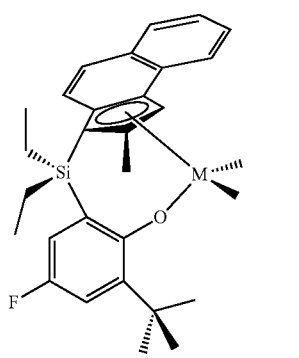
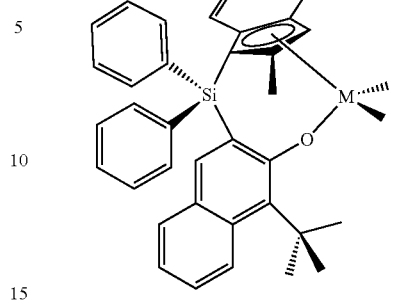
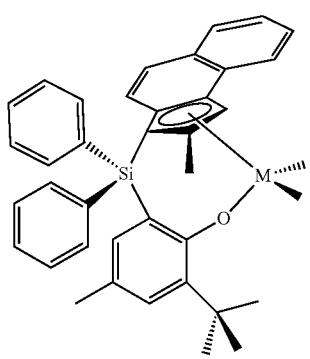
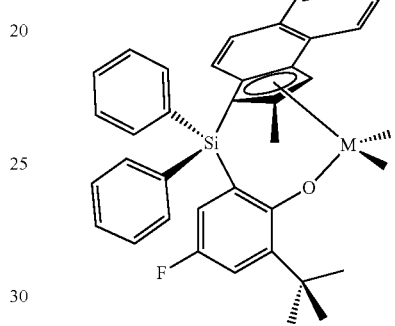
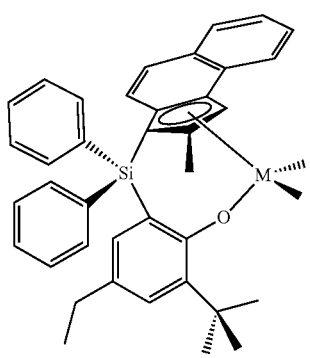
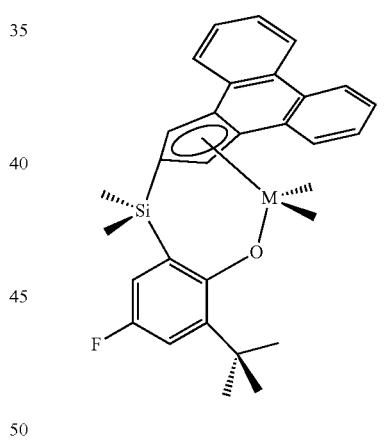
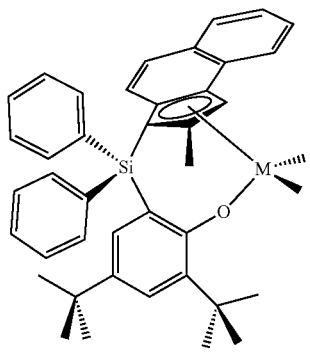
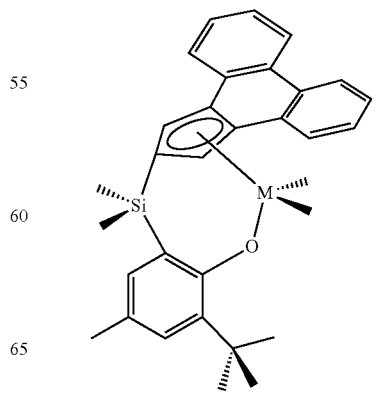

-continued
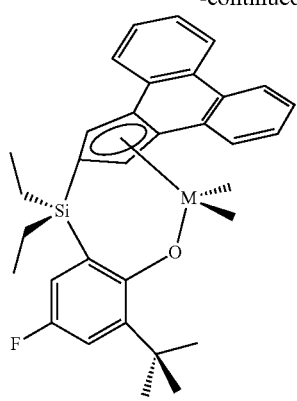
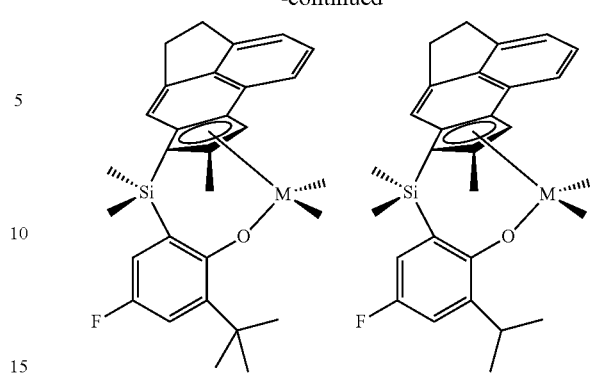
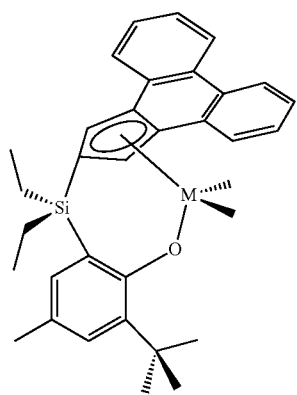
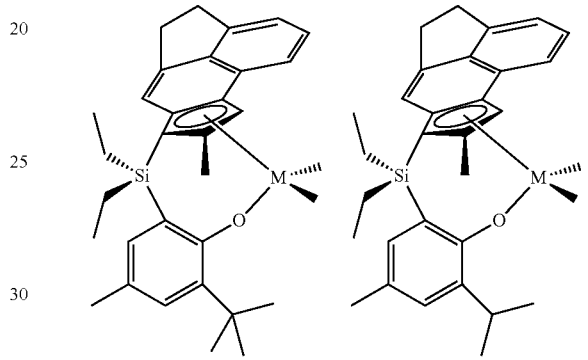
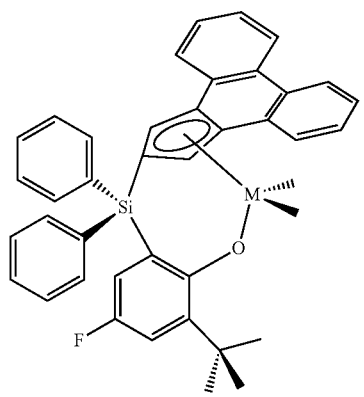
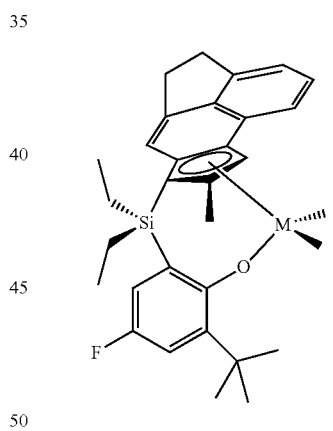
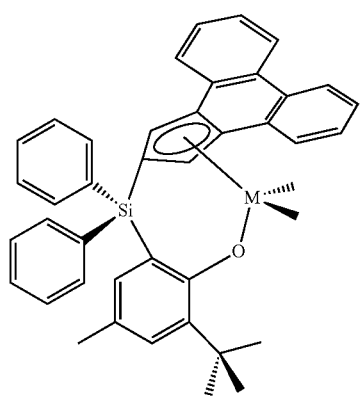
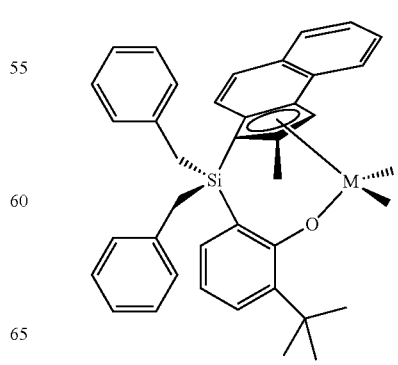

-continued

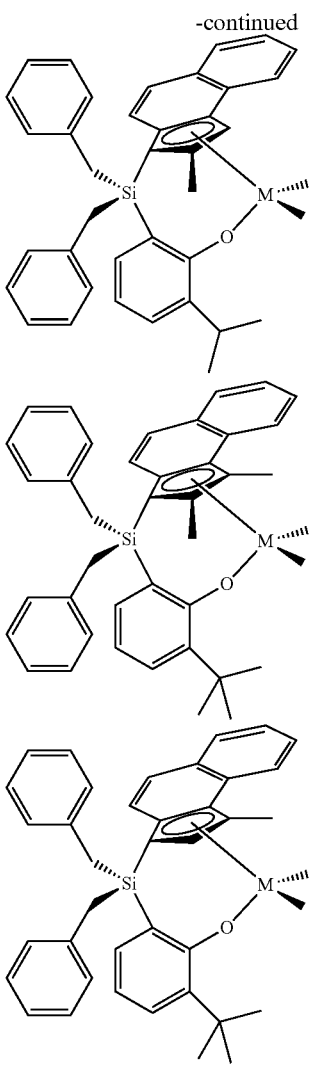

wherein M is titanium, zirconium or hafnium.

6. A transition metal catalyst composition for preparing an ethylene homopolymer or a copolymer of ethylene and α-olefin, comprising:
the transition metal compound of claim 1; and
a cocatalyst selected from an aluminum compound, a boron compound, or a mixture thereof.

7. The transition metal catalyst composition of claim 6, wherein the aluminum compound used as the cocatalyst is at least one of alkylaluminoxane and organoaluminum.

8. The transition metal catalyst composition of claim 6, wherein the aluminum compound cocatalyst has a molar ratio of transition metal (M) to aluminum atom (Al) (M:Al) of 1:10 to 5,000.

9. The transition metal catalyst composition of claim 6, wherein the boron compound used as the cocatalyst is selected from N,N-dimethylanilinium tetrakis(pentafluorophenyl)borate, triphenylmethylium tetrakis(pentafluorophenyl)borate, tris(pentafluorophenyl)borane, or a mixture thereof.

10. The transition metal catalyst composition of claim 6, wherein the molar ratio of the transition metal compound to the cocatalyst, transition metal:boron atom:aluminum atom is in the range of 1:0.1 to 100:10 to 3,000.

11. The transition metal catalyst composition of claim 10, wherein the molar ratio of the transition metal compound to the cocatalyst, transition metal:boron atom:aluminum atom is in the range of 1:0.5 to 5:100 to 3,000.

12. A method for preparing an ethylene homopolymer or a copolymer of ethylene and α-olefin in the presence of the transition metal catalyst composition of claim 6.

13. The method of claim 12, wherein the α-olefin copolymerized with ethylene is at least one selected from propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-octadecene, 1-eicosene, cyclopentene, cyclohexene, norbornene, phenyl norbornene, styrene, alpha-methylstyrene, p-methylstyrene, and 3-chloromethylstyrene, and the copolymer of ethylene and α-olefin has an ethylene content of 30 to 99 wt %.

14. The method of claim 13, wherein a homopolymerization of ethylene or a copolymerization of ethylene monomer and α-olefin is performed at a reactor pressure of 1 to 1000 atm and a polymerization reaction temperature of 25 to 400° C.

15. The method of claim 14, wherein the homopolymerization of ethylene or the copolymerization of ethylene monomer and α-olefin is performed under a reactor pressure of 10 to 150 atm and a polymerization reaction temperature of 100 to 200° C.

16. The method of claim 15, wherein an ethylene homopolymer or a copolymer of ethylene and α-olefin having a number average molecular weight of 1,000 g/mol or more and an ultralow density of less than 0.900 g/cc is prepared at a polymerization reaction temperature of less than 180° C.

17. The method of claim 15, wherein an ethylene homopolymer or a copolymer of ethylene and α-olefin having a number average molecular weight of 1,000 g/mol or more and a density of 0.900 g/cc or more is prepared at a polymerization reaction temperature of 180° C. or more.

* * * * *